(12) United States Patent
Tsuda

(10) Patent No.: US 10,048,998 B2
(45) Date of Patent: Aug. 14, 2018

(54) TRANSMISSION APPARATUS AND FAILURE DETECTION METHOD

(71) Applicant: FUJITSU LIMITED, Kawasaki-shi, Kanagawa (JP)

(72) Inventor: Masayuki Tsuda, Nomi (JP)

(73) Assignee: FUJITSU LIMITED, Kawasaki (JP)

( * ) Notice: Subject to any disclaimer, the term of this patent is extended or adjusted under 35 U.S.C. 154(b) by 76 days.

(21) Appl. No.: 15/378,421

(22) Filed: Dec. 14, 2016

(65) Prior Publication Data

US 2017/0212797 A1     Jul. 27, 2017

(30) Foreign Application Priority Data

Jan. 21, 2016   (JP) .................................. 2016-010097

(51) Int. Cl.
G06F 11/00      (2006.01)
G06F 11/07      (2006.01)
G06F 11/10      (2006.01)

(52) U.S. Cl.
CPC ........ *G06F 11/079* (2013.01); *G06F 11/0706* (2013.01); *G06F 11/1004* (2013.01)

(58) Field of Classification Search
USPC ...................................................... 714/48, 49
See application file for complete search history.

(56) References Cited

U.S. PATENT DOCUMENTS

| | | | |
|---|---|---|---|
| 6,469,854 B1* | 10/2002 | Gill | G11B 19/04 360/31 |
| 2008/0137972 A1* | 6/2008 | Yamada | G06T 1/20 382/232 |
| 2012/0072801 A1* | 3/2012 | Takeuchi | G06F 1/3203 714/755 |
| 2014/0047282 A1* | 2/2014 | Deb | G06F 11/0751 714/48 |
| 2014/0173233 A1* | 6/2014 | Higashiyama | G06F 11/1441 711/162 |

FOREIGN PATENT DOCUMENTS

| | | |
|---|---|---|
| JP | 2002-64490 | 2/2002 |
| JP | 2009-278576 | 11/2009 |
| JP | 2011-146774 | 7/2011 |

* cited by examiner

*Primary Examiner* — Sarai E Butler
(74) *Attorney, Agent, or Firm* — Staas & Halsey LLP

(57) ABSTRACT

There is provided a transmission apparatus including: a memory in which history data of a rewrite process on which an in-device header referred in a device is rewritten is stored, the history data including data before and after the rewrite process is stored, and the device of one or more devices included in the transmission apparatus receiving a first frame including the in-device header, performing a specific process and the rewrite process, and outputting a second frame including a rewritten in-device header; and a processor configured to detect a failure of the device, based on data on the in-device header of the first frame, data on the rewritten in-device header of the second frame, and the history data stored in the memory.

8 Claims, 22 Drawing Sheets

FIG.11

REWRITE HISTORY MANAGEMENT TABLE(LIU#A)

| FRAME ID | FPGA IDENTIFICATION INFORMATION | bit | VALUE (BEFORE UPDATE) | VALUE (AFTER UPDATE) |
|---|---|---|---|---|
| 1 | Policer IG | 12:0 | All "0" | ALL "1" |
| 1 | Policer IG | 18:16 | 0 | 3 |
| 1 | Policer IG | 40 | 1 | 0 |
| 1 | Policer IG | 110:105 | "00000" | "10001" |
| 1 | BWBIF IG | 46 | 0 | 1 |
| 1 | ... | ... | ... | ... |
| 1 | Shaper EG | 242:240 | 3 | 2 |

FIG.12

FRAME COMMUNICATION ROUTE TABLE

| LIU CARD ID (INGRESS/ EGRESS) | FPGA IDENTIFICATION INFORMATION |
|---|---|
| LIU#A IG | Forward |
| LIU#A IG | Policer |
| LIU#A IG | BWBinf |
| LIU#B EG | BWBinf |
| LIU#B EG | Forward |
| LIU#B EG | Shaper |

FRAME COMMUNICATION ROUTE TABLE

| INGRESS/ EGRESS | FPGA |
|---|---|
| LIU#A IG | Forward |
| LIU#A IG | Policer |
| LIU#A IG | BWBinf |
| LIU#A EG | BWBinf |
| LIU#A EG | Forward |
| LIU#A EG | Shaper |

REWRITE HISTORY MANAGEMENT TABLE(LIU#A)

| FRAME ID | FPGA | bit | VALUE (BEFORE UPDATE) | VALUE (AFTER UPDATE) |
|---|---|---|---|---|
| 1 | Policer IG | 12:0 | All "0" | ALL "1" |
| 1 | Policer IG | 18:16 | 0 | 3 |
| 1 | Policer IG | 46 | 0 | 1 |
| ... | ... | ... | ... | ... |
| 1 | Shaper EG | 242:240 | 3 | 2 |

REWRITE HISTORY MANAGEMENT TABLE(LIU#A)

| FRAME ID | FPGA | bit | VALUE (BEFORE UPDATE) | VALUE (AFTER UPDATE) |
|---|---|---|---|---|
| 1 | Policer IG | 12:0 | All "0" | ALL "1" |
| 1 | Policer IG | 18:16 | 0 | 3 |
| 1 | Policer IG | 46 | 0 | 1 |
| ... | ... | ... | ... | ... |
| 1 | Shaper EG | 242:240 | 3 | 2 |

(9) FRAME REGENERATION AT THE TIME OF INPUT TO POLICER FPGA, CRC CALCULATION

(10) COMPARISON WITH STACKED CRC → MISMATCH, DETECTION OF FAILURE IN POLICER FPGA

TRANSMISSION APPARATUS AND FAILURE DETECTION METHOD

CROSS-REFERENCE TO RELATED APPLICATION

This application is based upon and claims the benefit of priority of the prior Japanese Patent Application No. 2016-010097, filed on Jan. 21, 2016, the entire contents of which are incorporated herein by reference.

FIELD

The embodiments discussed herein are related to a transmission apparatus and a failure detection method for a device included in the transmission apparatus.

BACKGROUND

FIG. 1 is a view illustrating one example of an internal process of a transmitter P100. The transmitter P100 is an apparatus for performing frame transmission, e.g., in a network of a carrier. The transmitter P100 includes, for example, a plurality of line interface unit (LIU) cards P1, a back wire board (BWB) P3 and a control card (not illustrated). Each LIU card P1 is an interface card. The BWB P3 is a switch card which interconnects LIUs in a full mesh. The control card controls the LIU cards P1 and the BWB P3.

Each LIU card P1 includes a plurality of field programmable gate arrays (FPGAs). In the example illustrated in FIG. 1, the FPGAs included in each LIU card P1 are a forward FPGA P103B, a policer FPGA P103C, a BWB interface FPGA P103D and a shaper FPGA P103E. The FPGAs are integrated circuits for executing their respective programmed processes.

A frame input to the transmitter P100 is processed and transmitted by each FPGA in each LIU card P1. An in-device header is added to the frame input to the transmitter P100. The in-device header is information used to process an output port or each FPGA in the transmitter P100 of the frame and includes information referred to by each card in the transmitter P100. Each FPGA processes the frame by referring to the in-device header, rewrites the in-device header and transmits the frame.

FIG. 2 is a view illustrating one example of an error detecting process in an LIU card P1. Each FPGA in the LIU card P1 adds an error detection code to a frame output to a FPGA at the next stage. The next stage FPGA calculates an error detection code from the input frame and checks whether or not the calculated error detection code matches the error detection code added to the input frame. If the calculated error detection code does not match the error detection code added to the input frame, data abnormality such as a bit error or the like in transmission between FPGAs is detected.

For example, as an error detection code, FCS (Frame Check Sequence) is used between an MAC/PHY circuit P103A and the forward FPGA P103B, and between the shaper FPGA P103E and the MAC/PHY circuit P103A. For example, as an error detection code, BIP (Bit Interleaved Parity) is used between the forward FPGA P103B and the policer FPGA P103C, between the policer FPGA P103C and the BWB interface FPGA P103D, between the BWB interface FPGA P103D and the forward FPGA P103B, and between the forward FPGA P103B and the shaper FPGA P103E.

Related technologies are disclosed in, for example, Japanese Laid-Open Patent Publication No. 2009-278576, Japanese Laid-Open Patent Publication No. 2002-064490, and Japanese Laid-Open Patent Publication No. 2011-146774.

SUMMARY

According to an aspect of the invention, a transmission apparatus includes: a memory in which history data of a rewrite process on which an in-device header referred in a device is rewritten is stored, the history data including data before and after the rewrite process is stored, and the device of one or more devices included in the transmission apparatus receiving a first frame including the in-device header, performing a specific process and the rewrite process, and outputting a second frame including a rewritten in-device header; and a processor configured to detect a failure of the device, based on data on the in-device header of the first frame, data on the rewritten in-device header of the second frame, and the history data stored in the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 illustrates one example of a rewrite history management table;

FIG. 12 illustrates one example of a frame communication route table;

DESCRIPTION OF EMBODIMENTS

Figure 1:
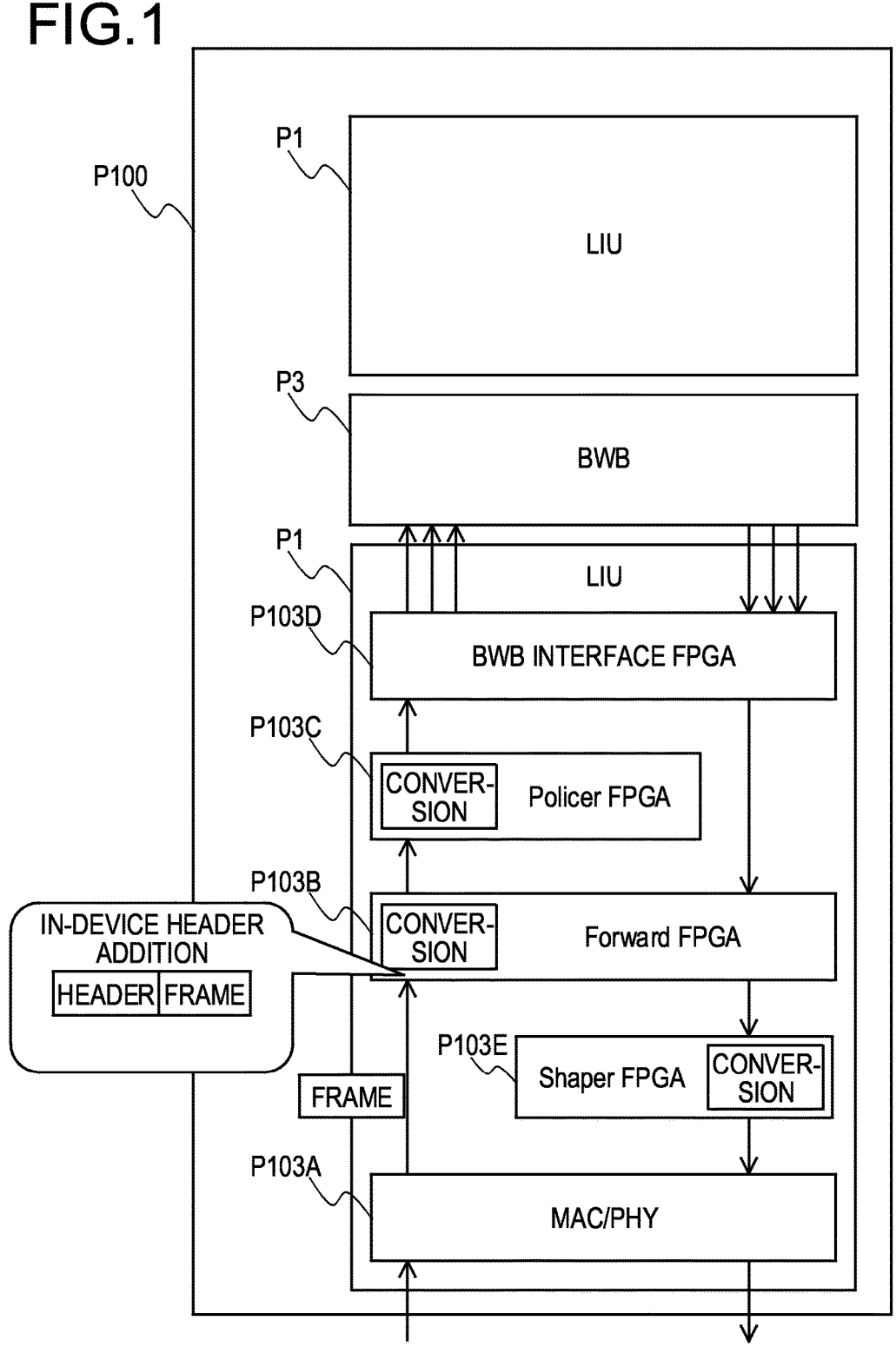
FIG. 1 is a view illustrating one example of an internal process of a transmitter.
Figure 2:
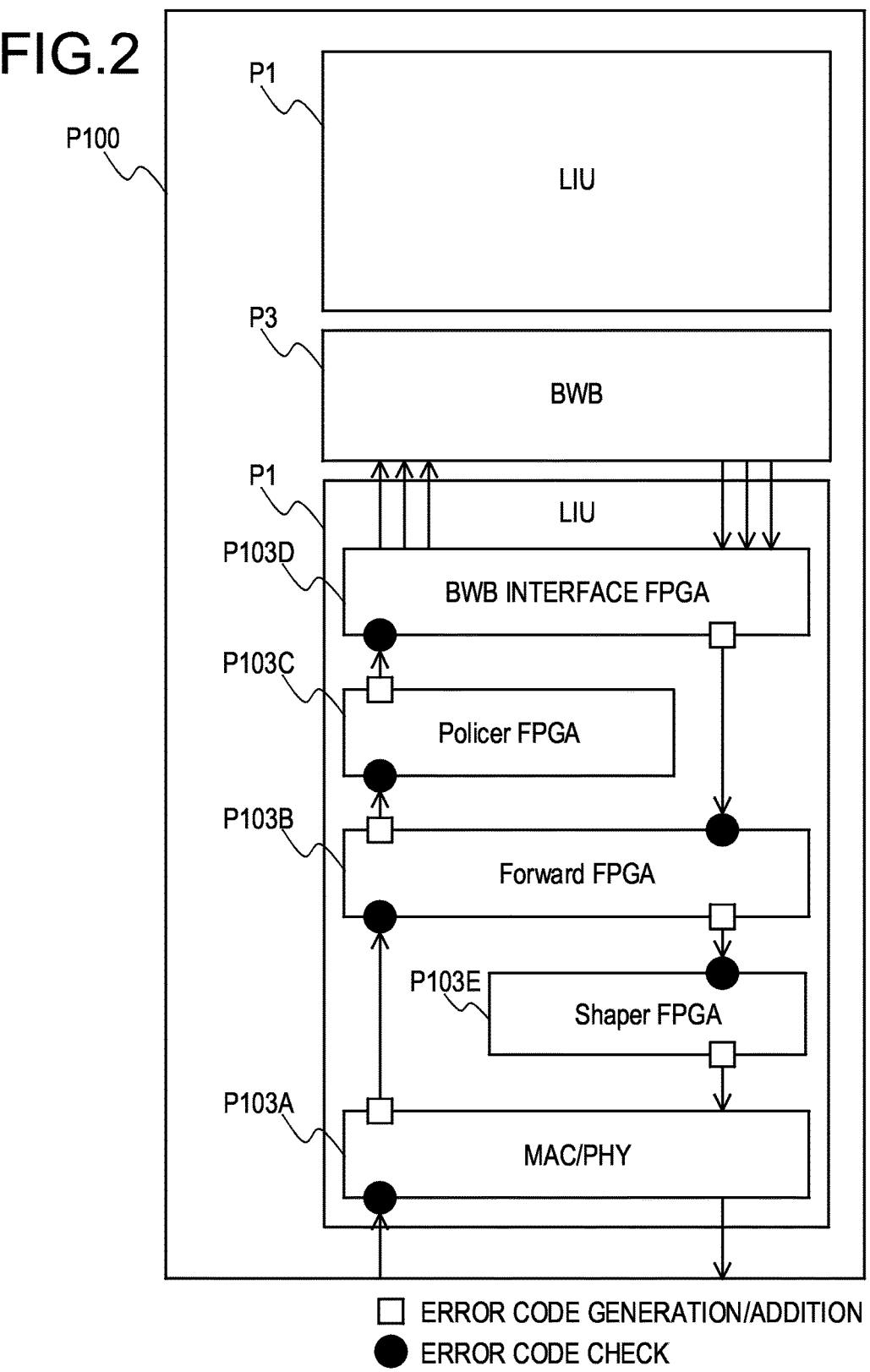
FIG. 2 is a view illustrating one example of an error detecting process in an LIU card.
Figure 3:
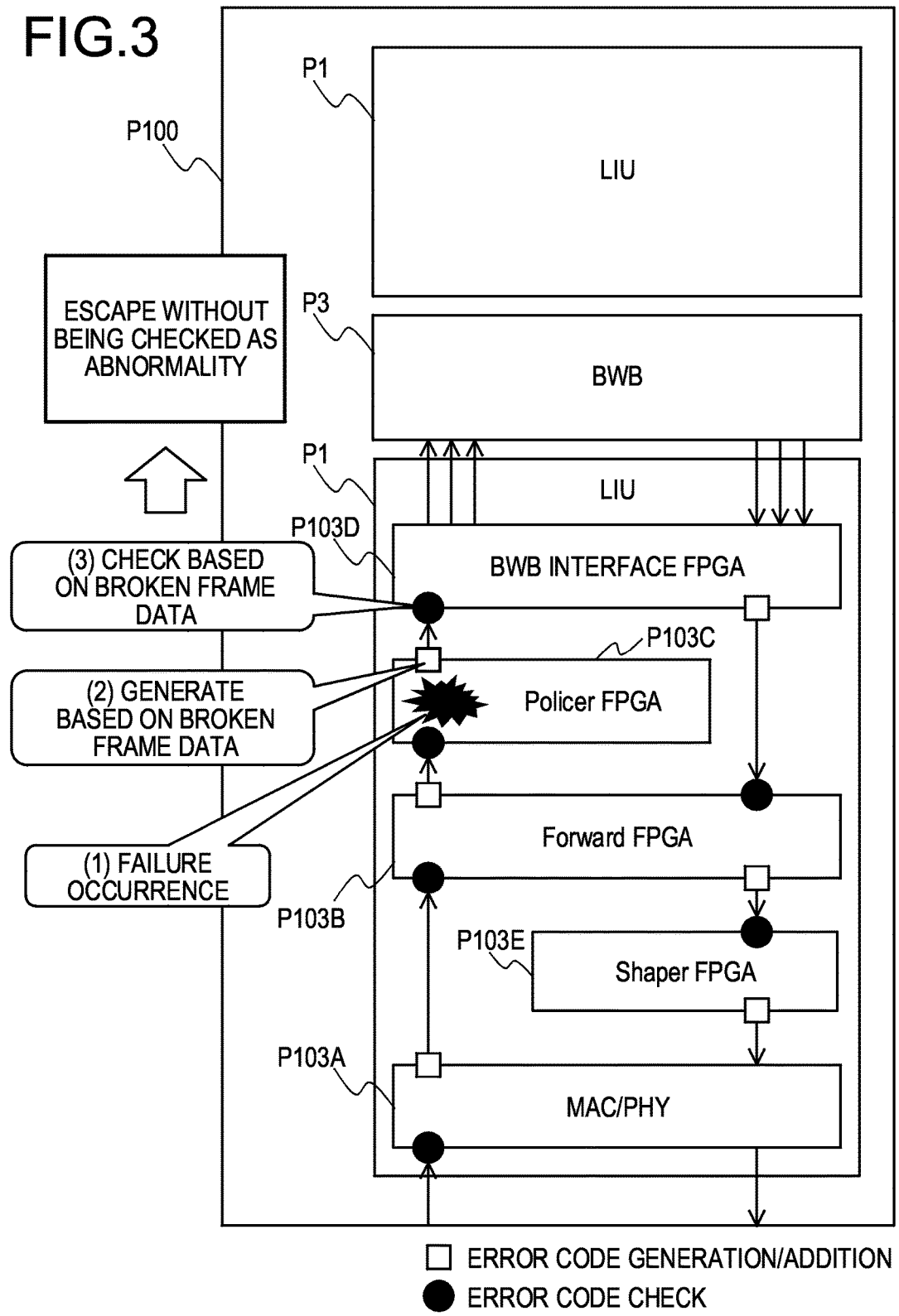
FIG. 3 is a view illustrating one example of a problem of the error detecting process in an LIU card.

FIG. 3 is a view illustrating one example of a problem of the error detecting process in an LIU card P1. In the error detecting process of the LIU card P1 illustrated in FIG. 2, an abnormality due to a data transmission between FPGAs may be detected. However, since each FPGA is not concerned with data other than an in-device header of an object to be rewritten, no error detecting process is performed for data abnormality in the FPGA. Therefore, when a failure occurs in the FPGA, it takes a relatively long time to specify a certain abnormality location.

For example, (1) it is assumed that a hardware failure has occurred in the policer FPGA P103C breaking the data of an original frame. (2) The policer FPGA P103C generates and adds an error detection code for the broken frame data and outputs the error detection code to the BWB interface FPGA P103D at the next stage. (3) The BWB interface FPGA P103D calculates an error detection code based on the frame data input from the policer FPGA P103C, that is, the broken frame data, and performs an error detection operation.

In this case, the error detection code added by the policer FPGA P103C and the error detection code calculated by the BWB interface FPGA P103D match with each other since these codes are calculated from the same broken data. As a result, an abnormality of the frame data slips out without being detected and the broken frame data is output to a network.

When the broken frame data is output to the network, for example, it may be considered that an error is detected in a destination device of the frame and a retransmission request for data including the frame occurs. In an event of hardware failure in an FPGA, since the frame data passing after the failure occurs are all broken, the retransmission request occurs frequently as the broken frame data are output to a network, which may cause a network congestion and have a serious impact on the network.

Hereinafter, some exemplary embodiments of a technique for specifying, at an early stage, a device in which an abnormality occurs will be described with reference to the drawings. The following embodiments are just illustrative and the present disclosure is not limited by the configurations of the embodiments.

First Embodiment

Figure 4:
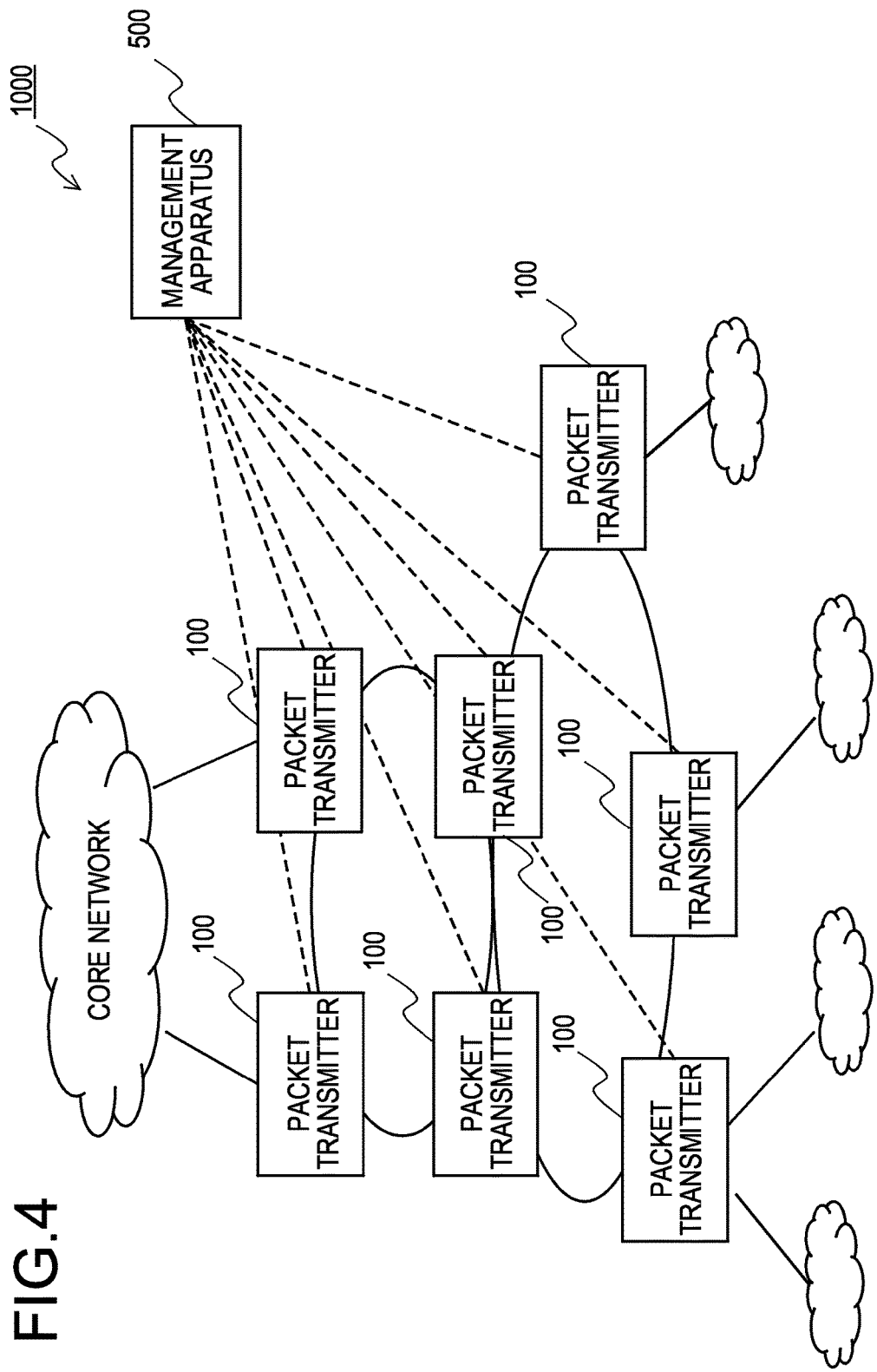
FIG. 4 is a view illustrating one example of a system configuration of a network system used by transmitters.

FIG. 4 is a view illustrating one example of a system configuration of a network system 1000 used by transmitters 100. The network system 1000 includes, e.g., a core network and an access network. In the example illustrated in FIG. 4, the access network includes a plurality of ring networks. A ring network is formed when a plurality of transmitters 100 is interconnected in a ring shape.

Each of the transmitters 100 is connected to a management apparatus 500 by a network separated from the access network. The management apparatus 500 manages the transmitters 100. For example, a network management system (NMS) is constructed by the management apparatus 500 and the plurality of transmitters 100. A system configuration of the network used by the transmitters 100 is not limited to that illustrated in FIG. 4.

Figure 5:
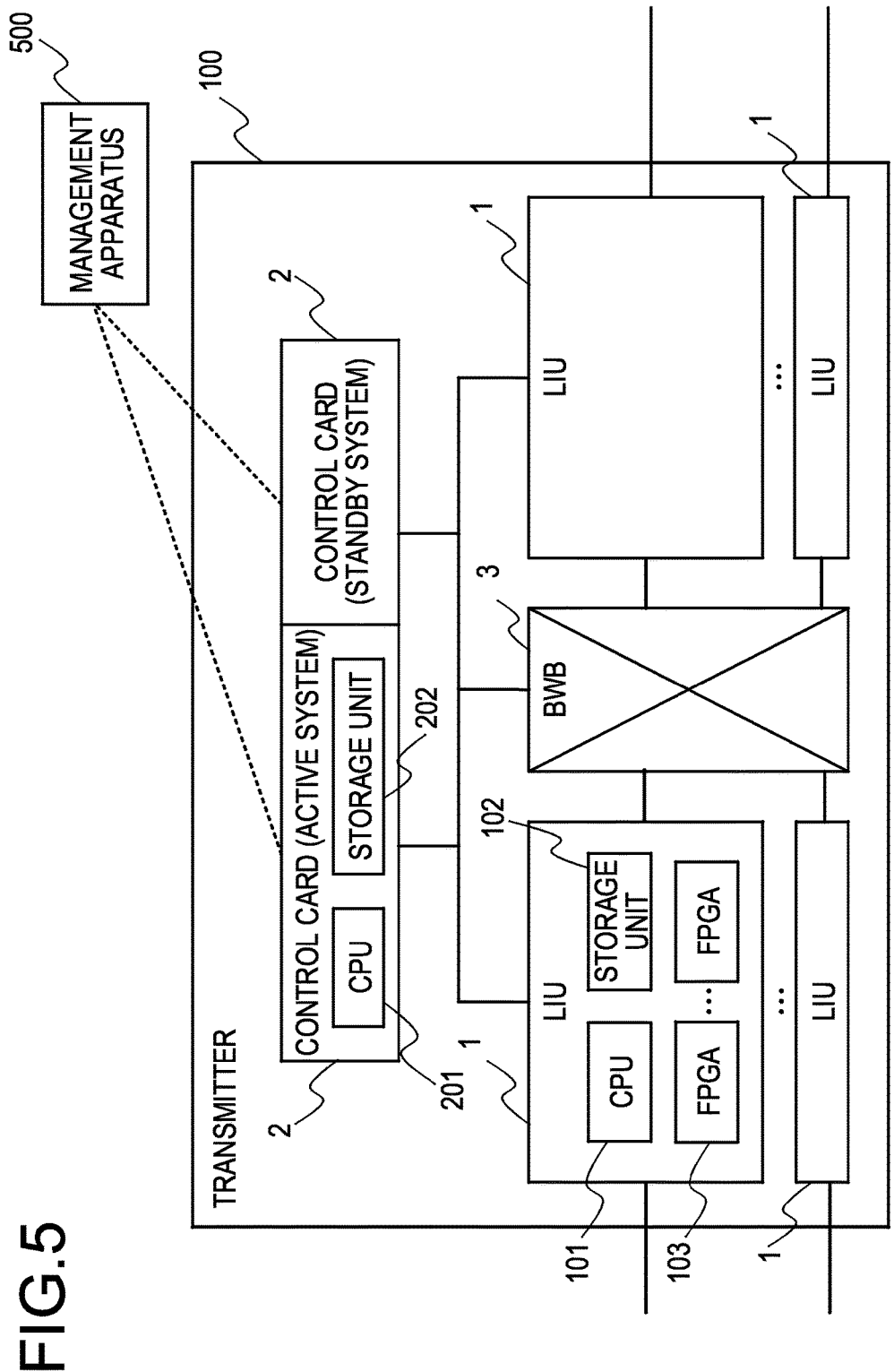
FIG. 5 is a view illustrating one example of a hardware configuration of a transmitter.

FIG. 5 is a view illustrating one example of a hardware configuration of a transmitter 100. The transmitter 100 is, e.g., a layer-two switch. In the first embodiment, the transmitter 100 may be an apparatus for a large-scale network. In the first embodiment, the transmitter 100 may be an apparatus acting as the transmitter 100 when unit cards having different roles are inserted in a housing. The transmitter 100 is one example of a "transmission apparatus."

The transmitter 100 includes a plurality of LIU cards 1, control cards 2 and a BWB 3. Two control cards 2 for an active system and a standby system are included in the transmitter 100. However, since the active system of the control cards 2 has the same process as the standby system thereof, the control cards 2 will be hereinafter indicated as a single control card. Each LIU card 1 performs a process for a data signal. The process for a data signal performed in the LIU card 1 is, e.g., a transmission process, a band control process, etc.

Each LUI card 1 includes a CPU (Central Processing Unit) 101, a storage unit 102, a plurality of FPGAs 103 and a plurality of network interfaces (not illustrated). The storage unit 102 includes, e.g., a RAM (Random Access Memory), a ROM (Read Only Memory) and a nonvolatile memory. The network interfaces (not illustrated) included in the LIU card 1 are, e.g., LAN (Local Area Network) interfaces. An FGPA internal failure detection program is stored in the nonvolatile memory. The FGPA internal failure detection program is a program for specifying an FPGA 103 where an internal failure occurs, among the FPGAs 103 included in the LIU card 1. The FGPA internal failure detection program is provided as, e.g., a firmware. The FPGA 103 is one example of a "device." However, the "device" is not limited to the FPGA 103 but may be an integrated circuit such as, e.g., an ASIC (Application Specific Integrated Circuit).

The BWB 3 is a switch card which interconnects LIU cards 1 in a full mesh. An in-device header is added to a frame input to the transmitter 100 by an input side LIU card 1. Information of an output port of the transmitter 100 is included in the in-device header. The BWB 3 transmits the frame to an LIU card 1 having an output port indicated by the in-device header by referring to the in-device header of the input frame.

The control card 2 controls the LIU cards 1 and the BWB 3. The control card 2 includes a CPU 201, a storage unit 202 and a network interface (not illustrated). The network interface of the CPU 201 is connected to a network of communication with the management apparatus 500. For example, a management protocol such as, e.g., an SNMP (Simple Network Management Protocol), a TL1 (Transaction Language One), a Telnet/SSH (Secure Shell) or the like is used for communication between the management apparatus 500 and the transmitter 100. The CPU 201 is one example of a "control unit."

A RAM, a ROM and a nonvolatile memory are included in the storage unit 202 of the control card 2. A failure detection program is stored in the nonvolatile memory. The failure detection program is a program for detecting an internal failure of the FPGA included in each LIU card 1 in the transmitter 100. In the first embodiment, the failure detection program is provided as firmware. For example, upon receiving an instruction for transition to a failure detection mode from the management apparatus 500, the control card 2 starts to execute the failure detection program. The storage unit 202 is one example of a "storage unit."

Figure 6:
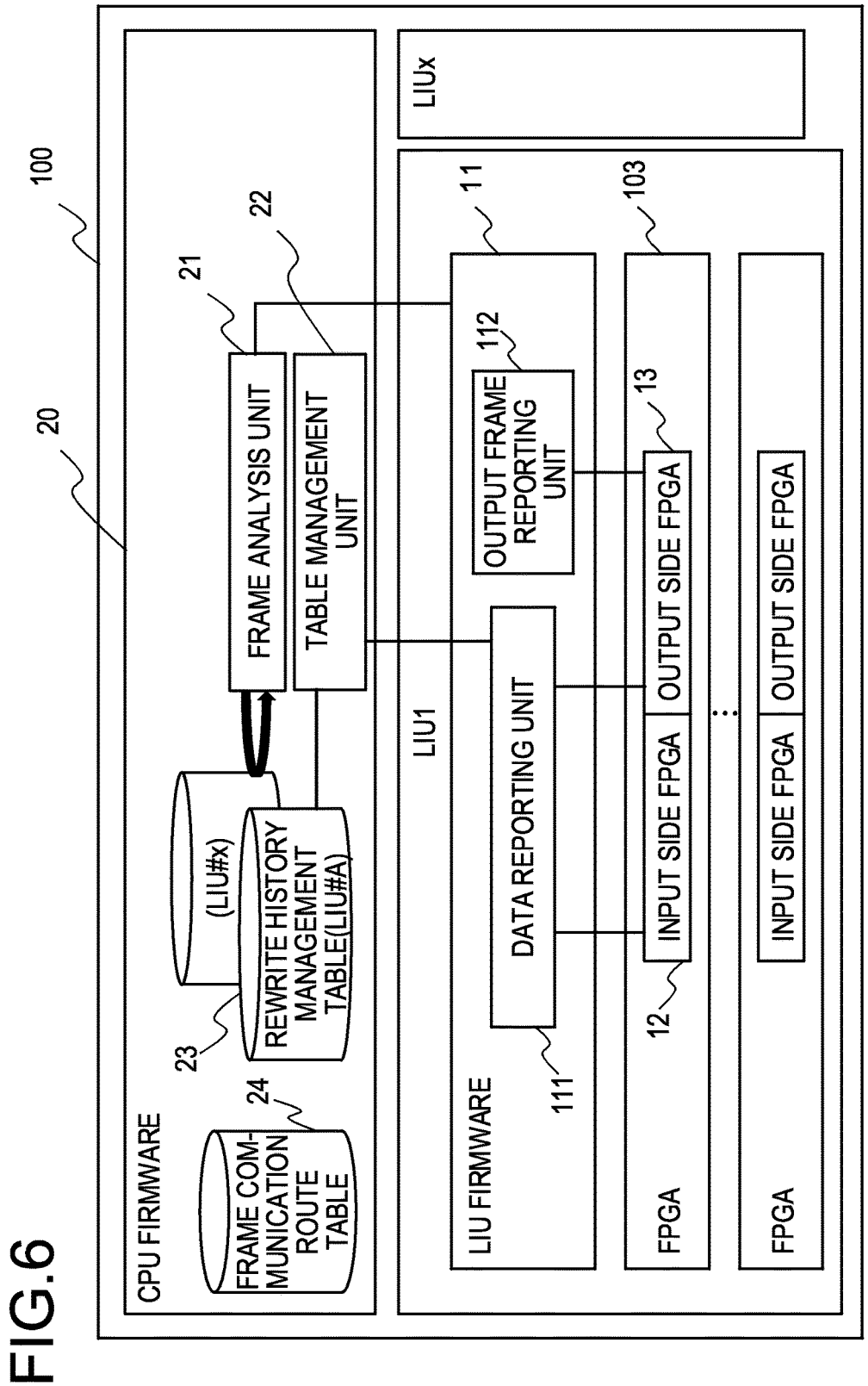
FIG. 6 is a view illustrating one example of a functional configuration of the transmitter.

FIG. 6 is a view illustrating one example of a functional configuration of the transmitter 100. The transmitter 100 includes a CPU firmware 20, an LIU firmware 11, an input side FPGA 12, and an output side FPGA 13, as a functional configuration.

Each of the input side FPGA 12 and the output side FPGA 13 is a functional configuration implemented by the FPGA 103. The input side FPGA 12 performs a process for a frame input from a network to the transmitter 100. The output side FPGA 13 performs a process for a frame output from the transmitter 100 to the network.

A frame of user data is routed in the order of LIU card 1→BWB 3→LIU 1 in the transmitter 100. Hereinafter, an LIU card 1 through which the frame is first routed in the transmitter 100 will be called an input side LIU card and an LIU card 1 through which the frame is routed after the BWB 3 will be called an output side LIU card. The input side LIU card and the output side LIU card may be either the same LIU card 1 or different LIU cards 1. In the input side LIU card, the frame passes through the input side FPGA 12. In the output side LIU card, the frame passes through the output side FPGA 13. The functional configuration of the input side FPGA 12 and the output side FPGA 13 will be described in more detail later.

The FPGA 103 has one or both of the functions of the input side FPGA 12 and the output side FPGA 13 depending on the process characteristics to be set. For example, a forwarding FPGA has both of the functions of the input side FPGA 12 and the output side FPGA 13. A policer FPGA has the function of the input side FPGA 12 but does not have the function of the output side FPGA 13. A shaper FPGA has the function of the output side FPGA 13 but does not have the function of the input side FPGA 12.

The LIU firmware 11 has a functional configuration implemented when the CPU 101 of the LIU card 1 executes the FPGA internal failure detection program stored in the nonvolatile memory. The LIU firmware 11 includes a data reporting unit 111 and an output frame reporting unit 112. The data reporting unit 111 acquires information of contents of rewrite process of an in-device header from the input side FPGA 12 and the output side FPGA 13 and reports the acquired information to the CPU firmware 20. The output frame reporting unit 112 reports a frame, which is reported from an output side FPGA 13 at the final stage and has an in-device header rewritten by each FPGA through which the frame is routed and a CRC (Cyclic Redundancy Check) calculated by the FPGA, to the CPU firmware 20.

The CPU firmware 20 is a functional configuration implemented when the CPU 201 of the control card 2 executes the failure detection program stored in the nonvolatile memory. The CPU firmware 20 includes a frame analysis unit 21, a table management unit 22, a rewrite history management table 23 and a frame communication route table 24. The CPU firmware 20 will be described in more detail later.

Figure 7:
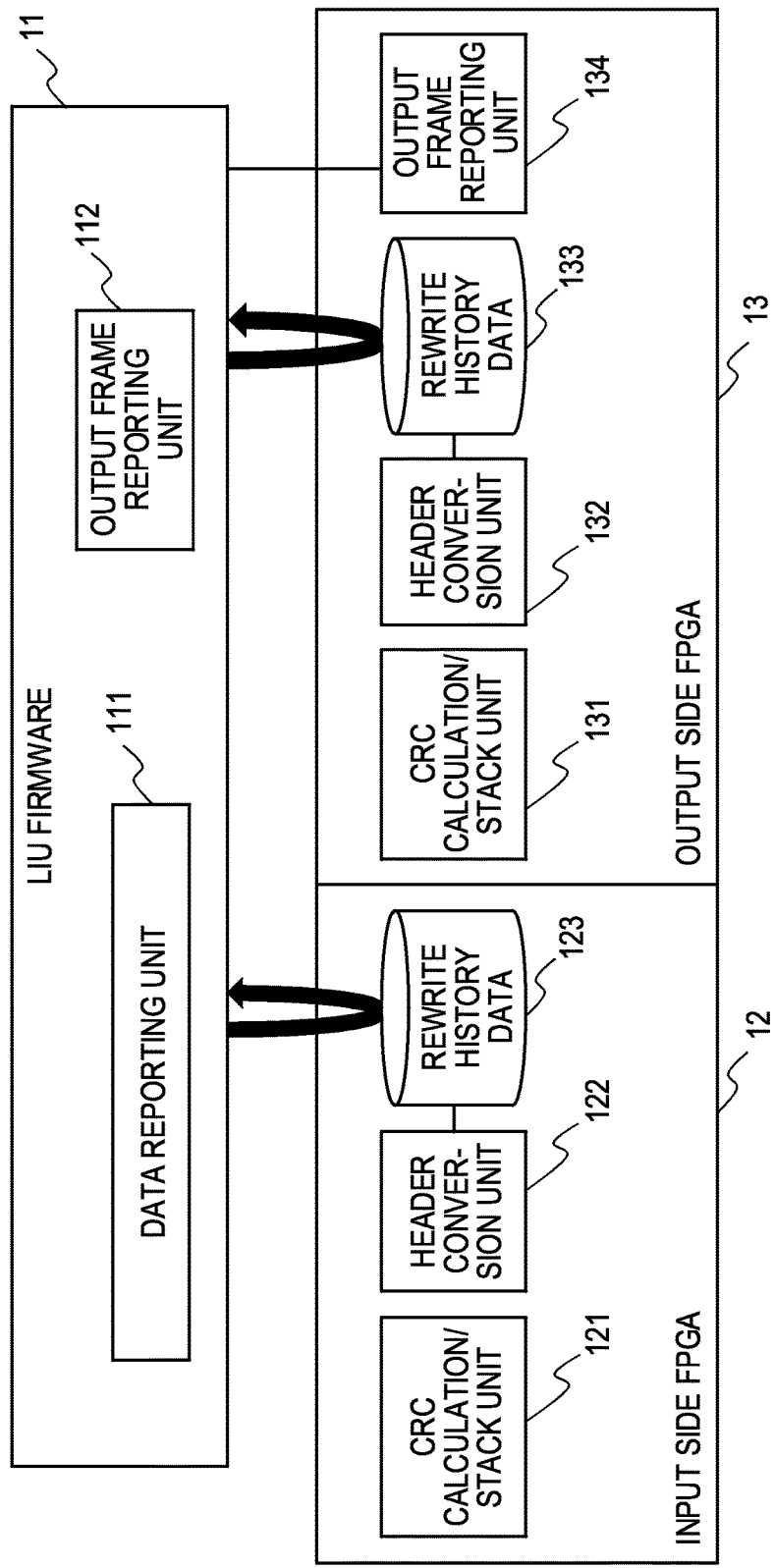
FIG. 7 is a view illustrating one example of details of a functional configuration of an LIU card.

FIG. 7 is a view illustrating one example of details of the functional configuration of the LIU card 1. The input side FPGA 12 includes a CRC calculation/stack unit 121, a header conversion unit 122 and a rewrite history data storage unit 123. The output side FPGA 13 includes a CRC calculation/stack unit 131, a header conversion unit 132, a rewrite history data storage unit 133 and an output frame reporting unit 134 as a functional configuration. The functional configuration of each of the input side FPGA 12 and the output side FPGA 13 is implemented by an electronic circuit in each FPGA 103.

Each of the CRC calculation/stack units 121 and 131 performs a CRC calculation for an input frame and adds (stacks) a result of the CRC calculation to the frame. In the first embodiment, an object of the CRC calculation is an original data portion and an in-device header portion of the frame. The CRC calculation is one example of a "predetermined calculation."

Next to the CRC calculation/stack units 121 and 131, each of the header conversion units 122 and 132 performs a process set in each FPGA for the input frame and performs a process of rewriting the in-device header. The header conversion units 122 and 132 write information of contents of rewrite process of the in-device header in the rewrite history data storage units 123 and 133, respectively. Hereinafter, the information of contents of rewrite process of the in-device header will be called rewrite history data. The rewrite history data includes, e.g., identification information of an FPGA as a creation source, a frame ID, a rewrite position, a value before rewrite, a value after rewrite, etc. The identification information of an FPGA as a creation source of the rewrite history data includes, e.g., information indicating whether an FPGA is at an input side or at an output side. The rewrite process of the in-device header is one example of a "process" performed by the "circuit."

Each of the rewrite history data storage units 123 and 133 corresponds to a register in the FPGA 103. When the rewrite history data is written in the register secured as each of the rewrite history data storage units 123 and 133, an interrupt process for the LIU firmware 11 is generated. In response to the generation of the interrupt process, the data reporting unit 111 of the LIU firmware 11 reads the rewrite history data written in the rewrite history data storage units 123 and 133 and reports the read rewrite history data to the CPU firmware 20. That is, in the first embodiment, the rewrite history data is reported to the CPU firmware 20 every time the rewrite process of the in-device header is generated.

However, the method as to how to collect the rewrite history data is not limited to reporting the rewrite history data to the CPU firmware 20 every rewrite process of the in-device header. For example, the rewrite history data may be collected at a predetermined period. When the rewrite history data is collected at the predetermined period, each of the rewrite history data storage units 123 and 133 is created in the RAM of each FPGA 103. The data reporting unit 111 of the LIU firmware 11 reads the rewrite history data from the rewrite history data storage units 123 and 133 of each FPGA 103 at a predetermined period and reports the read the rewrite history data to the CPU firmware 20. A period at which the rewrite history data is read from the rewrite history data storage units 123 and 133 of the FPGA 103 is set to, e.g., an order of 100 miliseconds.

An input side FPGA 12 at the first stage has a process different from those in input side FPGAs 12 at the second and subsequent stages. The input side FPGA 12 at the first stage refers to an FPGA in the transmitter 100 to which a frame is first input and an FPGA which adds an in-device header to the frame. In the transmitter 100, the input side FPGA 12 at the first stage is not uniquely determined. An LIU card 1 of which an FPGA 103 becomes a first stage FPGA depends on a frame route.

A process in the first stage input side FPGA 12 is as follows. Since an original frame to which no in-device header is added is input to the first stage input side FPGA 12, an in-device header is first generated by the header conversion unit 122 and is added to the frame. Subsequently, the CRC calculation/stack unit 121 performs a CRC calculation for the in-device header and the original frame, adds the frame to a result of the CRC calculation, and outputs the result. In addition, since the in-device header is generated in the first stage input side FPGA 12, a process of rewriting the in-device header is not performed. Therefore, in the first embodiment, in the first stage input side FPGA 12, the rewrite history data is not written in the rewrite history data storage unit 123 and the rewrite history data of the first stage input side FPGA 12 is not written in the rewrite history management table 23 of the CPU firmware 20.

In addition, an output side FPGA 13 at the final stage has a process different from those in other output side FPGAs 13. The output side FPGA 13 at the final stage refers to an FPGA in the transmitter 100 through which a frame passes finally and an FPGA which removes an in-device header from the frame. In the transmitter 100, the FPGA 103 at the final stage is not uniquely determined. Rather, an LIU card 1 of which an FPGA 103 becomes a final stage FPGA depends on a frame route.

A process in the final stage output side FPGA 13 is as follows. The final stage output side FPGA 13 further includes the output frame reporting unit 134. In the final stage output side FPGA 13, the CRC calculation/stack unit 131 first performs CRC calculation for an input frame and adds a result of the CRC calculation to the frame. Subsequently, the header conversion unit 132 performs a process of rewriting the in-device header and writes the rewrite history data in the rewrite history data storage unit 133.

The header conversion unit 132 outputs a copy of the frame subjected to the rewrite process of the in-device header to the output frame reporting unit 134. In addition, the header conversion unit 132 removes the in-device header and the CRC calculation results added by its own and other FPGAs 103 from the frame subjected to the rewrite process of the in-device header and outputs the frame without the in-device header and the like.

The output frame reporting unit 134 reports the frame subjected to the rewrite process of the in-device header, which is input from the header conversion unit 132, to the LIU firmware 11. The output frame reporting unit 112 of the LIU firmware 11 reports a frame reported from the output side FPGA 13, to the CPU firmware 20. Therefore, the frame reported to the CPU firmware 20 is a frame which is added with the in-device header and the CRC calculation results calculated by each of the CRC calculation/stack units 121 and 132 of the FPGA 103 through which the frame passed.

Figure 8:
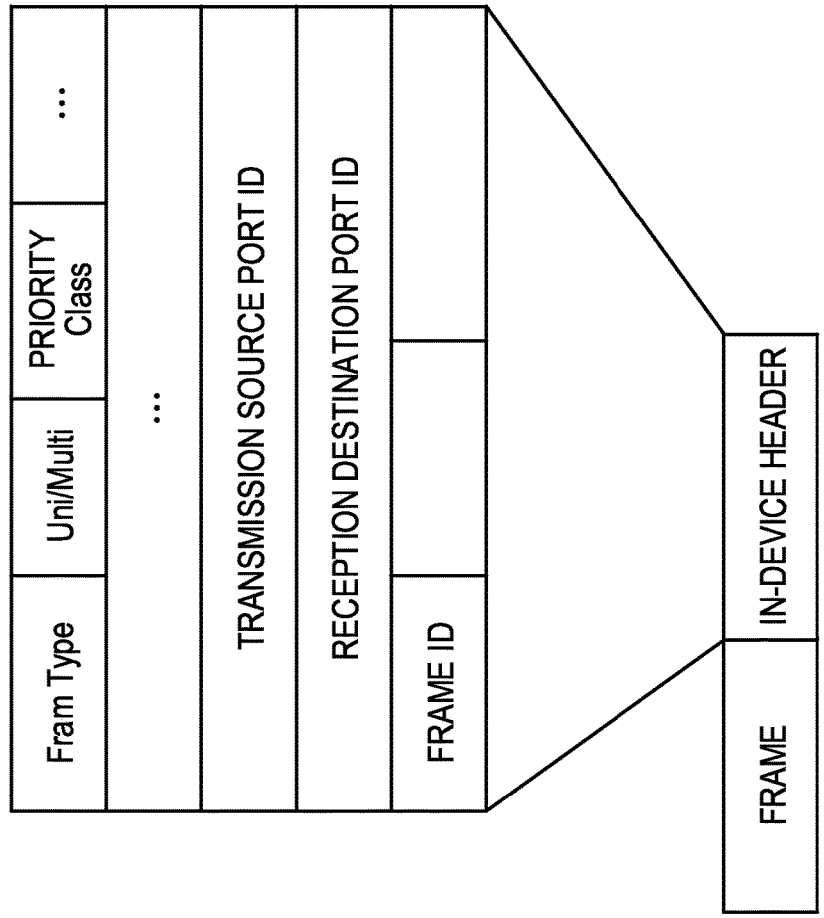
FIG. 8 illustrates one example of a format of an in-device header.

FIG. 8 illustrates one example of a format of an in-device header. The in-device header has a fixed length. For example, fields of a frame type, unicast/multicast, priority class, transmission source port ID, reception destination port ID, frame ID, etc. are included in the in-device header.

Information of a creation protocol of data included in the frame is stored in the field of "frame type." Information indicating whether the frame is a unicast frame or a multicast frame is stored in the field of "unicast/multicast." Information indicating the priority of the frame is stored in the field of "priority class." An ID of a port to which the frame is input is stored in the field of "transmission source port ID." An ID of a port from which the frame is output to a network is stored in the field of "reception destination port ID."

An ID for identifying the frame in the transmitter 100 is stored in the field of "frame ID." The frame ID is uniquely set in the transmitter 100.

The in-device header is generated by the header conversion unit 122 of the first stage input side FPGA 12 and is added to the frame. In addition, the in-device header is removed by the header conversion unit 132 of the final stage output side FPGA 13.

The in-device header format illustrated in FIG. 8 is just illustrative. The in-device header format is not limited to that illustrated in FIG. 8. The in-device header format varies depending on the specifications of the transmitter 100. In addition, in the first embodiment, the frame ID is included in the in-device header. However, for example, along with a result of CRC calculation, the frame ID may be added to the frame by each of the input side FPGA 12 and the output side FPGA 13.

Figure 9:
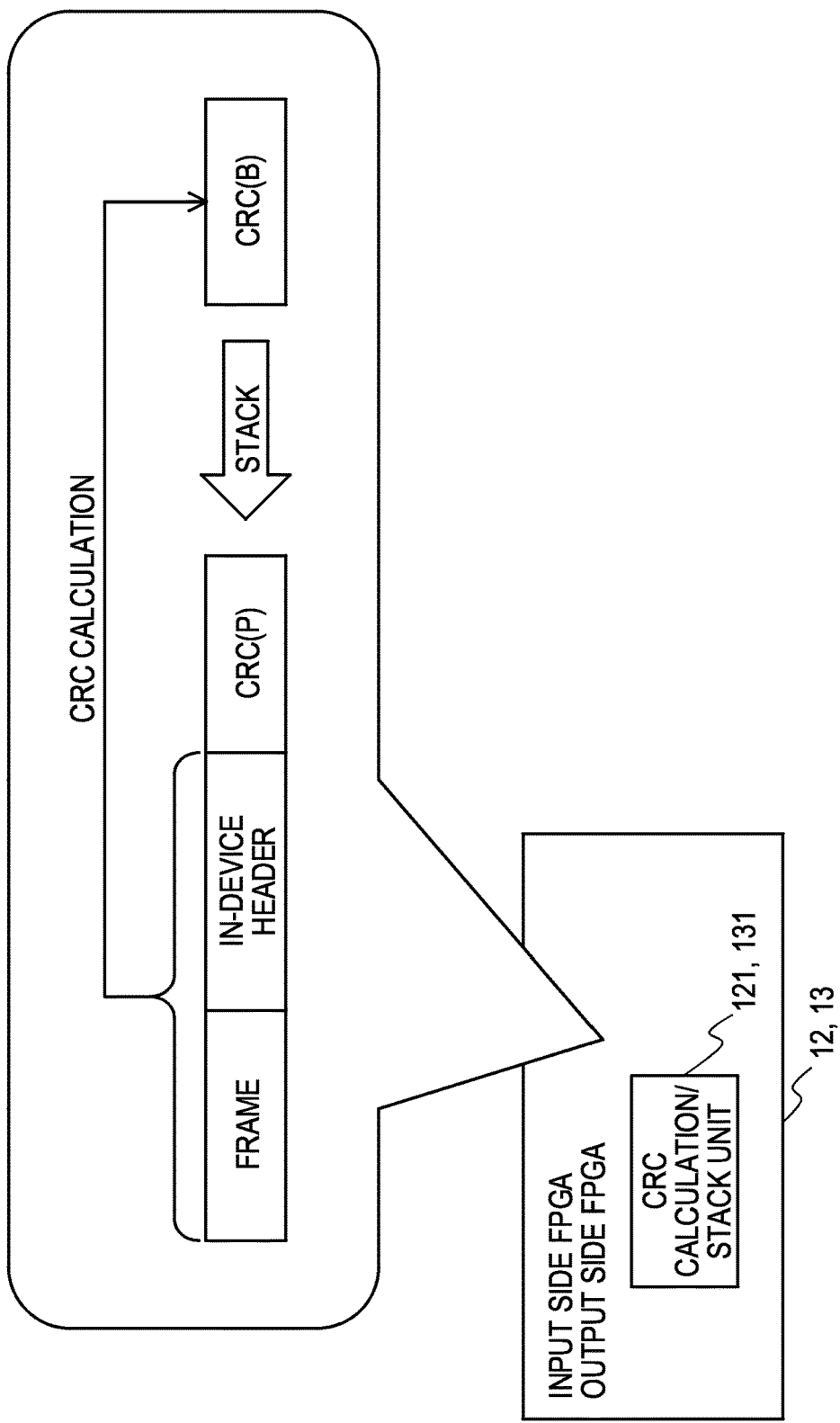
FIG. 9 is a view illustrating one example of a process of a CRC calculation/stack unit.

FIG. 9 is a view illustrating one example of a process of the CRC calculation/stack units 121 and 131. Each of the CRC calculation/stack units 121 and 131 performs a CRC calculation for an original frame portion and an in-device header portion of an input frame to its own input side FPGA 12 or output side FPGA 13. Each of the CRC calculation/stack units 121 and 131 adds a result of the CRC calculation to an input frame. The result of the CRC calculation is added to, e.g., the tail of the frame.

In the example illustrated in FIG. 9, a CRC(P) indicates a CRC calculation result calculated by a policer FPGA. A CRC(B) indicates a CRC calculation result calculated by a BWB interface FPGA.

Therefore, CRC calculation results calculated by the input side FPGA 12 and the output side FPGA 13 through which the frame passes are stacked in the frame in an order of the input side FPGA 12 and the output side FPGA 13 through which the frame passes.

Figure 10:
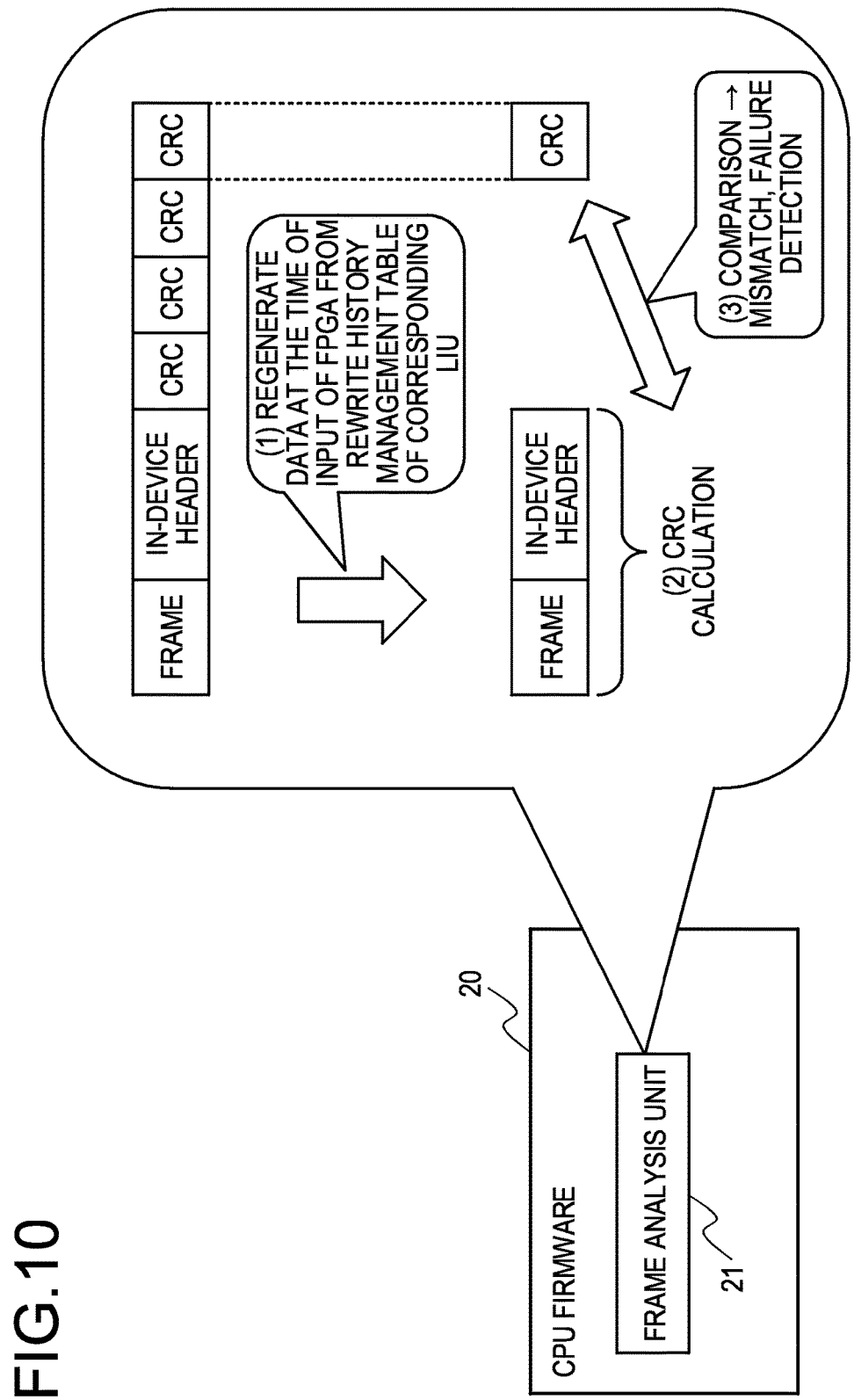
FIG. 10 is a view illustrating one example of a process of a frame analysis unit of a CPU firmware.

FIG. 10 is a view illustrating one example of a process of the frame analysis unit 21 of the CPU firmware 20. The frame analysis unit 21 analyzes a copy of an output frame which is reported from each LIU firmware 11 and is output from the final stage output side FPGA 13, and detects a failure occurrence of an FPGA 103 through which the frame passes, from a result of the analysis. An in-device header that has been rewritten and a plurality of CRC calculation results calculated by each of the input side FPGA 12 and output side FPGA 13 through which the frame passes are added to a frame input to the frame analysis unit 21.

The frame analysis unit 21 performs the following process for each of the input side FPGA 12 and output side FPGA 13 through which the frame passes, in an order reverse to the frame passing. Hereinafter, an input side FPGA 12 or output side FPGA 13 to be processed will be simply called a target FPGA.

(1) The frame analysis unit 21 performs a process reverse to the rewrite history data of the in-device header stored in the rewrite history management table 23 for the target FPGA, and regenerates a frame before the rewrite process, which is input to the target FPGA. The regenerated frame includes an original frame and an in-device header before the rewrite process. (2) The frame analysis unit 21 performs a CRC calculation for the regenerated frame. A target for the CRC calculation is an original frame and in-device header after the regeneration. (3) The frame analysis unit 21 compares the result of the CRC calculation of the regenerated frame with a result of the CRC calculation by the target FPGA which is added to the frame.

When the CRC calculation result of the regenerated frame does not match the CRC calculation result by the target FPGA which is added to the frame, the frame analysis unit 21 detects that a failure occurs in the target FPGA. Upon detecting the failure of the target FPGA, the frame analysis unit 21 transmits information of the target FPGA to the management apparatus 500. When the CRC calculation result of the regenerated frame matches the CRC calculation result by the target FPGA which is added to the frame, the frame analysis unit 21 decides that the target FPGA is normal and repeatedly performs the same process for the previous stage FPGA.

In addition, the CRC calculation result added to the frame reported to the frame analysis unit 21 is added in an order of the input side FPGA 12 and the output side FPGA 13 through which the frame passes. Therefore, the frame analysis unit 21 refers to the CRC calculation result sequentially from the tail of the frame. For example, in the frame, a bit stream indicating a partition is inserted between CRC calculation results of each FPGA, specifying how far one CRC calculation result spans.

The frame analysis unit 21 is one example of a "control unit." A frame input to the header conversion units 122 and 132 is one example of a "first frame." A frame output from the header conversion units 122 and 132 is one example of a "second frame" or "information on second frame." A CRC calculation result added to a frame by the CRC calculation/stack units 121 and 131 is one example of "information on first frame" or "first calculation result." The process (1) of FIG. 10 is one example of a "regeneration process of regenerating the first frame from the second frame." The process (3) of FIG. 10 is one example of a "comparison process."

FIG. 11 illustrates one example of the rewrite history management table 23. The rewrite history management table 23 is stored in the RAM of the control card 2 and is created one by one for each LIU card 1. The table management unit 22 manages the rewrite history management table 23.

One entry of the rewrite history management table 23 indicates information of a change process performed for one change portion of one frame by one input side FPGA 12 or output side FPGA 13 in the LIU card 1. The entry of the rewrite history management table 23 is rewrite history data which is created by the input side FPGA 12 or output side FPGA 13 in the LIU card 1 and reported from the LIU firmware 11 to the CPU firmware 20.

In the CPU firmware 20, the table management unit 22 receives the rewrite history data from each LIU firmware 11 and registers the rewrite history data, as a new entry, in the rewrite history management table 23 of the corresponding LIU card 1. For example, in the control card 2, since interfaces with LIU cards 1 are different, the table management unit 22 may be able to identify an LIU card 1 of a transmission source of the rewrite history data by a reception interface.

For example, items of a frame ID, FPGA identification information and input side/output side identification information, a bit position, a value before update and a value after update are included in the entry of the rewrite history management table 23. The frame ID is an ID for identifying a frame in the transmitter 100 and is stored in an in-device header of the frame. The FPGA identification information is identification information of an FPGA which created the entry. The input side/output side identification information is information indicating whether the FPGA which created the entry is the input side FPGA 12 or the output side FPGA 13. In the example illustrated in FIG. 11, for the input side FPGA 12, "IG" (InGress) is stored in the entry, along with the FPGA identification information. For the output side FPGA 13, "EG" (EGress) is stored in the entry, along with the FPGA identification information. The bit position is a position of a bit to be changed in an in-device header.

In the head entry of the rewrite history management table 23 illustrated in FIG. 11, the frame ID, the FPGA identification information and input side/output side identification information, the bit position, the value before update and the value after update are 1, Policer IG, 12:0, All "0" and All "1," respectively. The head entry of the rewrite history management table 23 illustrated in FIG. 11 indicates that all values from bit 0 to bit 12 of an in-device header of a frame of the frame ID "1" are changed from "1" to "0" by an input side FPGA 12 of the policer FPGA.

The data structure of the rewrite history management table 23 is not limited to that illustrated in FIG. 11. For example, when an item of identification information of the LIU card 1 is set in the entry, only one rewrite history management table 23 needs to be prepared for the transmitter 100. The rewrite history management table 23 is one example of a "storage unit." The rewrite history data is one example of "information on contents of a process performed by a circuit" or "process history information of a circuit."

FIG. 12 illustrates one example of the frame communication route table 24. The frame communication route table 24 is a table holding an order of the input side FPGA 12 and the output side FPGA 13 through which a frame passes in each LIU card 1. The frame communication route table 24 is stored in advance in the nonvolatile memory of the control card 2.

The entry of the frame communication route table 24 includes items of input side (INGRESS) or output side (EGRESS) information of the LIU card ID and FPGA identification information. One entry of the frame communication route table 24 indicates one FPGA in one LIU card 1. In the frame communication route table 24, entries are arranged in an order in which a fame passes.

In the example illustrated in FIG. 12, the item of the input side or output side of the LIU card ID indicates that a frame passes in an order of a forward FPGA, a policer FPGA and a BWB interface FPGA in the input side of LIU#A by three entries of "LIU#A 1G."

The frame communication route table 24 is used when the frame analysis unit 21 specifies a passage order of the input side FPGA 12 and output side FPGA 13 through which a frame reported from the final stage output side FPGA 13 passes. The data structure of the frame communication route table 24 is not limited to that illustrated in FIG. 12.

[Flow of Process]

Figure 13:
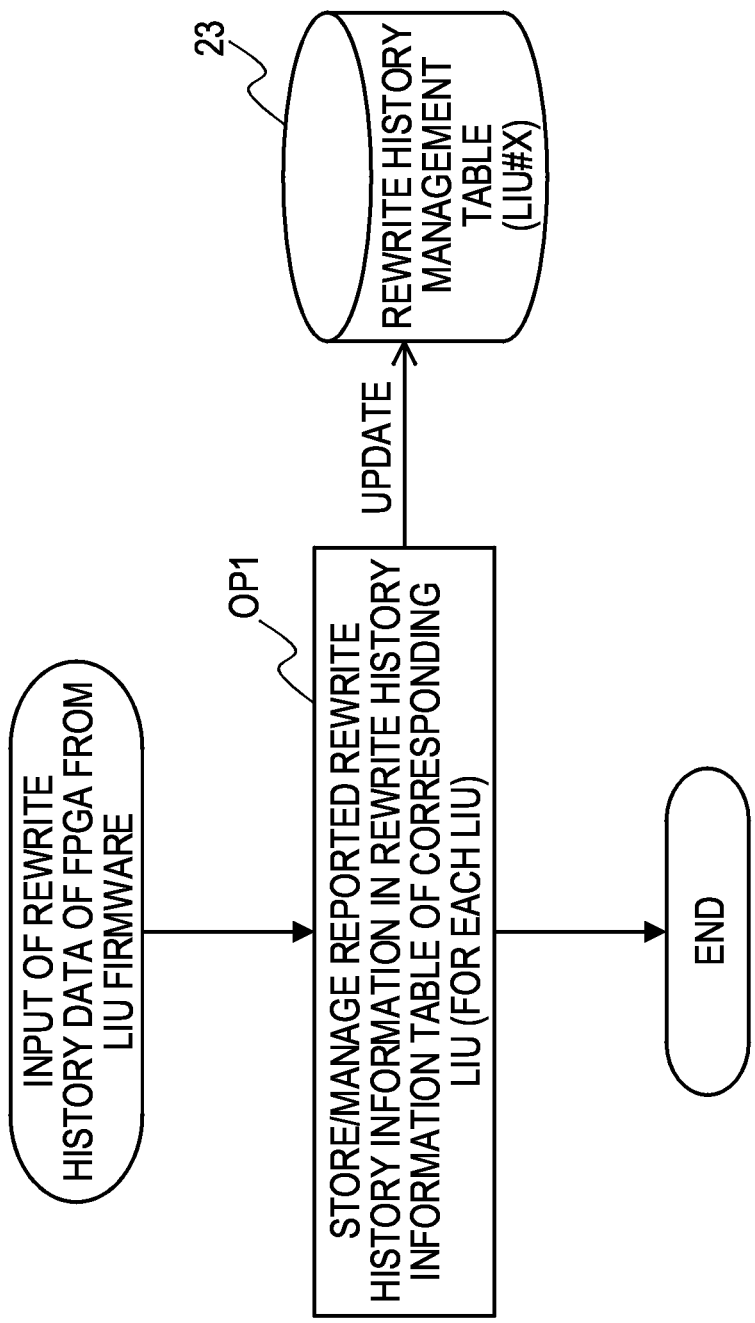
FIG. 13 illustrates one example of a flow chart of a process of a table management unit of the CPU firmware.

FIG. 13 illustrates one example of a flow chart of a process of the table management unit 22 of the CPU firmware 20. The process illustrated in FIG. 13 starts upon receiving a report of rewrite history data from the LIU firmware 11. In the following descriptions, the execution subject of the process of FIG. 13 is the table management unit 22, which is one functional configuration, for the sake of convenience, although it is actually the CPU 201 of the control card 2 which executes a failure detection program.

At OP1, the table management unit 22 stores the reported rewrite history data in the rewrite history management table 23 of the corresponding LIU card 1. Thereafter, the process illustrated in FIG. 13 is ended.

Figure 14:
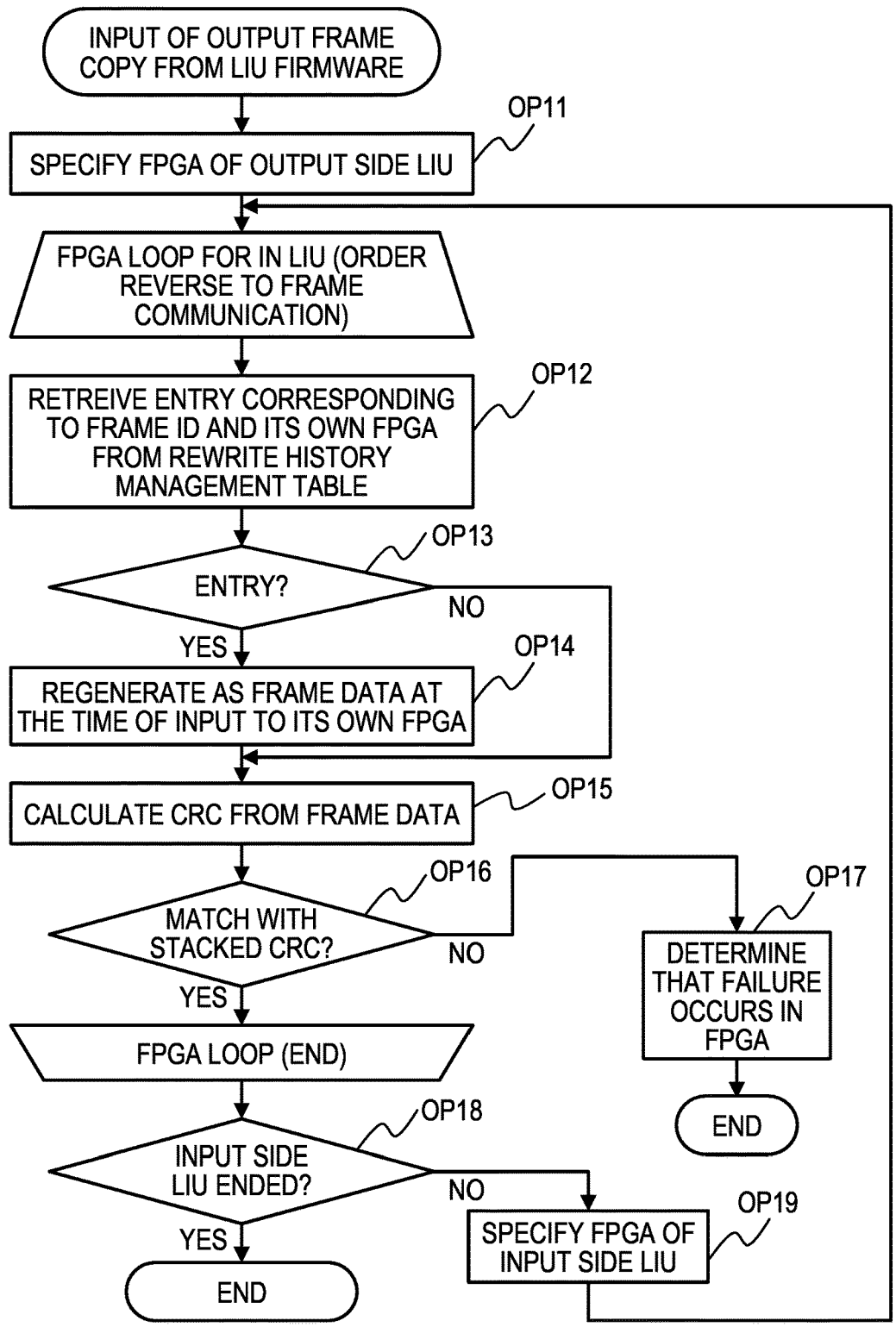
FIG. 14 illustrates one example of a flow chart of a process of the frame analysis unit of the CPU firmware.

FIG. 14 illustrates one example of a flow chart of a process of the frame analysis unit 21 of the CPU firmware 20. The process illustrated in FIG. 14 starts when a copy of an output frame from the final stage output side FPGA 13 is input from the LIU firmware 11. In the following descriptions, the execution subject of the process of FIG. 14 is the frame analysis unit 21, which is one functional configuration, for the sake of convenience, although it is actually the CPU 201 of the control card 2 which executes a failure detection program.

At OP11, the frame analysis unit 21 specifies an output side FPGA 13 of an output side LIU card through which the input frame passes and a passage order thereof by referring to the frame communication route table 24. More specifically, the frame analysis unit 21 extracts an entry having a card ID of an LIU card 1 of a frame reporting source and output side (EG) information from the frame communication route table 24.

The processes from OP12 to OP18 are repeatedly executed in an order reverse to a frame passage order by the number of output side FPGAs 13 of the output side LIU card through which the frame passes, the number being specified at OP11. Hereinafter, a frame to be processed, which is input to the frame analysis unit 21, will be called a target frame. In addition, an input side FPGA 12 or output side FPGA 13 to be processed will be called a target FPGA. An initial value of the target FPGA is an output side FPGA 13 through which the frame passes finally, that is, an FPGA of a tail entry among entries of the frame communication route table 24, which is extracted at OP11.

At OP12, the frame analysis unit 21 retrieves an entry corresponding to a frame ID of the target frame and the target FPGA from the rewrite history management table 23 of the output side LIU card. When there is a corresponding entry (YES in OP13), the process proceeds to OP14. When there is no corresponding entry (NO in OP13), this indicates that no rewrite process of an in-device header in the target FPGA is performed, and the process proceeds to OP15.

At OP14, the frame analysis unit 21 regenerates the target frame as a frame of the status at the time of input of the target FPGA according to an entry of the rewrite history management table 23 which corresponds to a result of the retrieval. More specifically, the frame analysis unit 21 rewrites a bit of a position indicated by the entry of the rewrite history management table 23 which corresponds to the retrieval result, from a value after conversion, which is indicated by the entry, to a value before conversion.

At OP15, the frame analysis unit 21 performs a CRC calculation for an original frame portion and an in-device header portion of the target frame.

At OP16, the frame analysis unit 21 determines whether or not a result of the CRC calculation at OP15 matches a result of the CRC calculation by the target FPGA stacked in the target frame. When it is determined that the result of the CRC calculation at OP15 matches the result of CRC calculation by the target FPGA included and stacked in the target frame (YES in OP16), the process for the target FPGA is ended and the process from OP12 is repeatedly performed for a one-stage previous FPGA. When it is determined that the result of the CRC calculation at OP15 does not match the result of CRC calculation by the target FPGA stacked in the target frame (NO in OP16), the process proceeds to OP17.

At OP17, since the result of the CRC calculation at OP15 does not match the result of the CRC calculation by the target FPGA stacked in the target frame, the frame analysis unit 21 decides that a failure has occurred in the target FPGA. The frame analysis unit 21 informs the management apparatus 500 that the failure has occurred in the target FPGA. Thereafter, the process illustrated in FIG. 14 is ended.

When the process from OP12 to OP17 is completed for all of output side FPGAs 13 of the output side LIU card, the process proceeds to OP18. At OP18, the frame analysis unit 21 determines whether or not a process for an input side FPGA 12 of an input side LIU card has been completed. When it is determined that the process for the input side FPGA 12 of the input side LIU card has not been completed (NO in OP18), the process proceeds to OP19. When it is determined that the process for the input side FPGA 12 of the input side LIU card has been completed (YES in OP18), the process illustrated in FIG. 14 is ended.

At OP19, the frame analysis unit 21 specifies the input side FPGA 12 of the input side LIU card. More specifically, the frame analysis unit 21 searches a rewrite history management table 23 having an entry corresponding to a frame ID of the target frame. An LIU card 1 corresponding to the rewrite history management table 23 having an entry corresponding to a frame ID of the target frame is specified as an input side LIU card. After specifying the input side LIU card, the frame analysis unit 21 specifies the input side FPGA 12 of the input side LIU card and a frame passage order from the frame communication route table 24.

Thereafter, the processes from OP12 to OP17 are repeatedly executed for the specified input side FPGA 12 of the input side LIU card in an order reverse to the frame passage order.

SPECIFIC EXAMPLES

Figure 15:
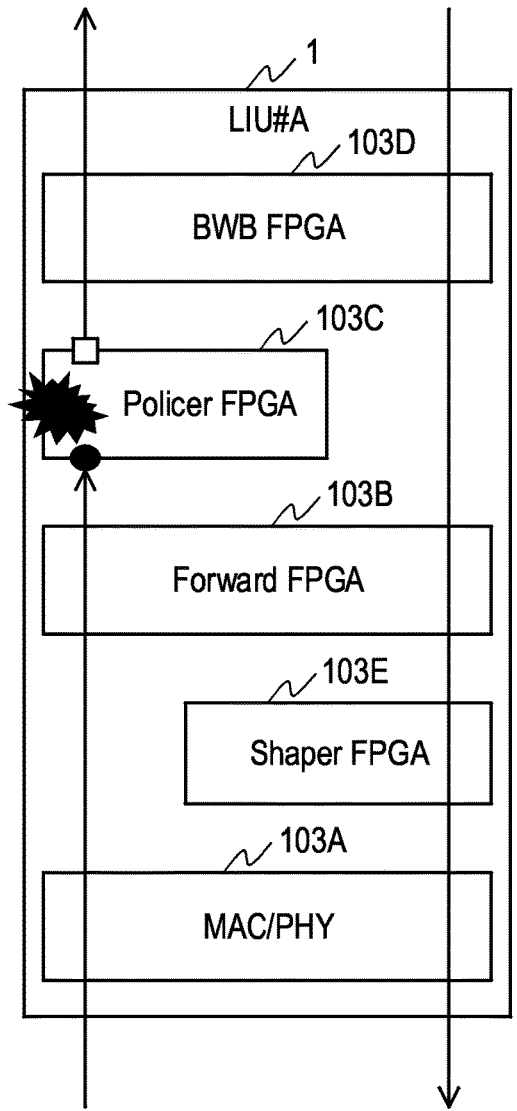
FIG. 15 is a view illustrating the premise on a specific example of a particular process of a failed FPGA of a transmitter.

FIG. 15 is a view illustrating the premise on a specific example of a specifying process of a failed FPGA of the transmitter 100. An LIU card #A of LIU cards 1 of the transmitter 100 is illustrated in FIG. 15. A portion related to the LIU card #A of the frame communication route table 24 in the specific example is also illustrated in FIG. 15. In FIG. 15, a frame passage order of an input side FPGA 12 in the LIU card #A is forward FPGA 103B→policer FPGA 103C→BWB interface FPGA 103D. In FIG. 15, a frame passage order of an output side FPGA 13 in the LIU card #A is BWB interface FPGA 103D→forward FPGA 103B→shaper FPGA 103E.

In the specific example, a process of the transmitter 100 will be described on the assumption that an internal failure has occurred in the policer FPGA 103C.

Figure 16:
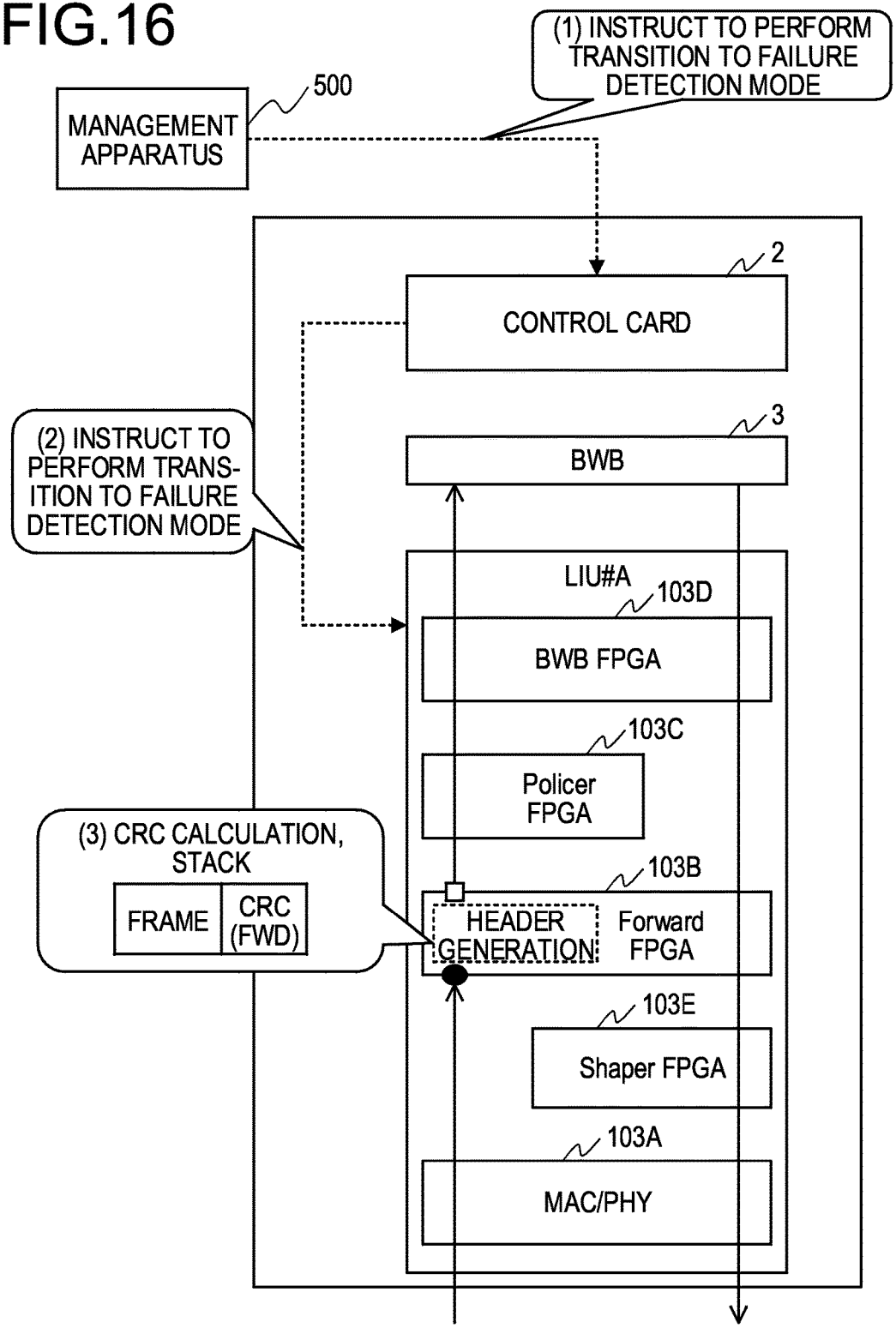
FIG. 16 is a view illustrating one example of a process of the transmitter in the specific example.

FIGS. 16, 17, 18 and 19 are views illustrating one example of a process of the transmitter 100 in the specific example. In FIG. 16, (1) for example, in response to an occurrence of abnormality such as congestion of a network, a manager transmits an instruction for transition to a failure detection mode from the management apparatus 500 to the transmitter 100 in the network.

(2) The CPU firmware 20 of the control card 2 of the transmitter 100 receives the instruction for transition to the failure detection mode from the management apparatus 500 and transmits the instruction for transition to the failure detection mode to each LIU card 1 in the transmitter 100. The LIU firmware 11 of each LIU card 1 sets the failure detection mode for each FPGA 103 in each LIU card 1.

Hereinafter, the process of the transmitter 100 will be described with attention paid to a frame of a frame ID "1" passing in an order of LIU card #A→BWB→LIU card #A. (3) When the failure detection mode is set, the CRC calculation/stack units 121 and 131 of each FPGA 103 begin to operate and a CRC calculation result calculated for an input frame is stacked in the frame. In FIG. 16, since the forward FPGA 103B is the first stage input side FPGA 12, the header conversion unit 122 of the input side FPGA 12 of the forward FPGA 103B generates an in-device header for the frame data. Since no rewrite process of the in-device header is generated in the forward FPGA 103B, no rewrite history data is reported to the CPU firmware 20 and no entry of the rewrite history management table 23 of the forward FPGA 103B is created.

Figure 17:
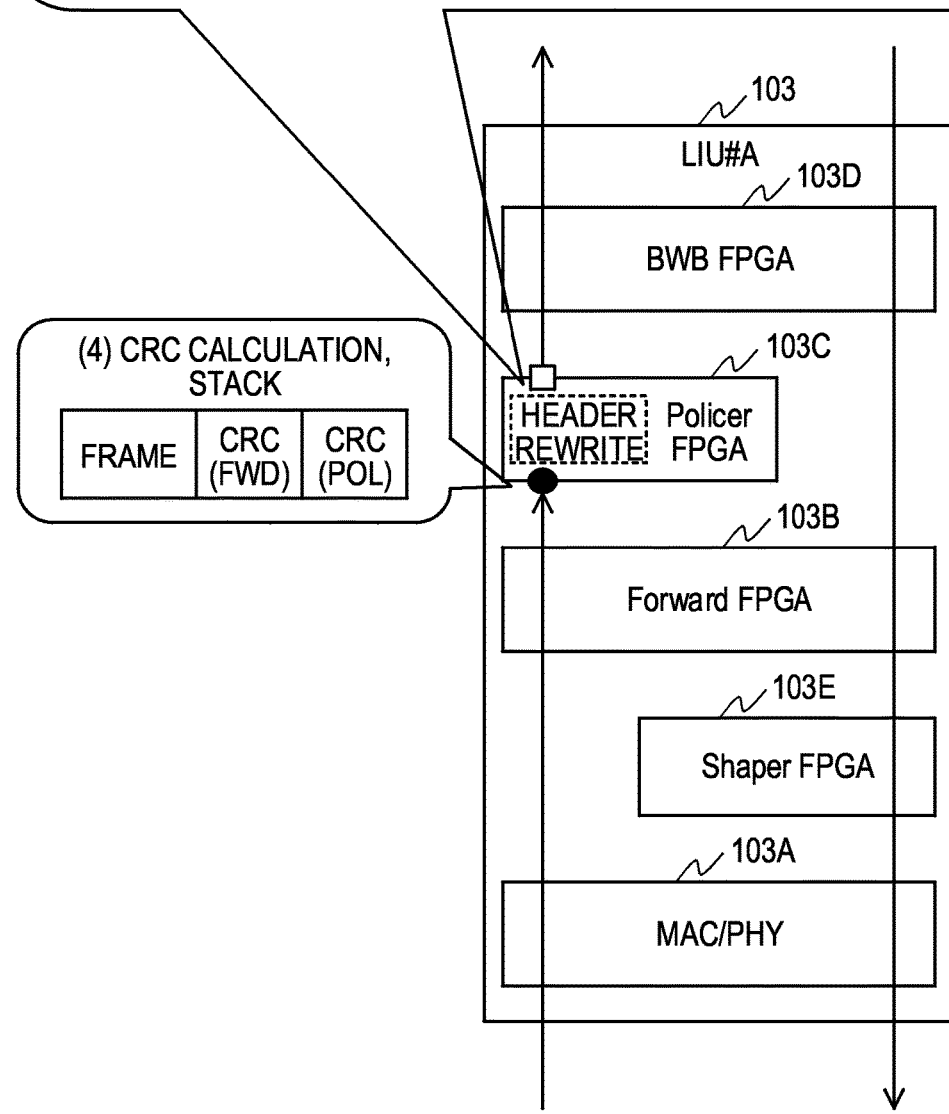
FIG. 17 is a view illustrating one example of a process of the transmitter in the specific example.

In FIG. 17, a frame is output from the forward FPGA 103B and is input to the policer FPGA 103C. (4) In the policer FPGA 103C, the CRC calculation/stack unit 121 of the input side FPGA 12 performs a CRC calculation for the input frame and stacks a result of the CRC calculation. The CRC calculation is performed for an original frame portion and an in-device header. The CRC calculation result calculated in the policer FPGA 103C is stacked after the CRC calculation result calculated in the forward FPGA 103B.

(5) The header conversion unit 122 of the input side FPGA 12 of the policer FPGA 103C writes the contents (rewrite history data) of the rewrite process of the in-device header in the rewrite history data storage unit 123 and reports the written rewrite history data to the CPU firmware 20. The data management unit 22 of the CPU firmware 20 writes the rewrite history data reported from the LIU firmware 11 of the LIU card #A in the rewrite history management table 23 of the LIU card #A (OP1 in FIG. 13). For example, the written rewrite history data has an entry in which a frame ID, FPGA identification information, a bit position, a value before update and a value after update are 1, policer input side (IG), $0^{th}$ bit to $12^{th}$ bit, All "0" and All "1," respectively, and an entry in which the frame ID, the FPGA identification information, the bit position, the value before update and the value after update are 1, policer input side (IG), $16^{th}$ bit to $18^{th}$ bit, 0 and 3, respectively.

In addition, in the specific example, since it is assumed that the internal failure has occurred in the policer FPGA 103C, a change occurs in the frame of the frame ID "1," in addition to the change made by the rewrite process indicated by the rewrite history data written in the rewrite history management table 23.

Thereafter, the stacking of CRC calculation results and the rewrite process of the in-device header are performed for the frame of the frame ID "1" in the same way in the input side FPGA 12 and output side FPGA 13 of the BWB interface FPGA 103D, the output side FPGA 13 of the forward FPGA 103B, and the output side FPGA 13 of the shaper FPGA 103E.

Figure 18:
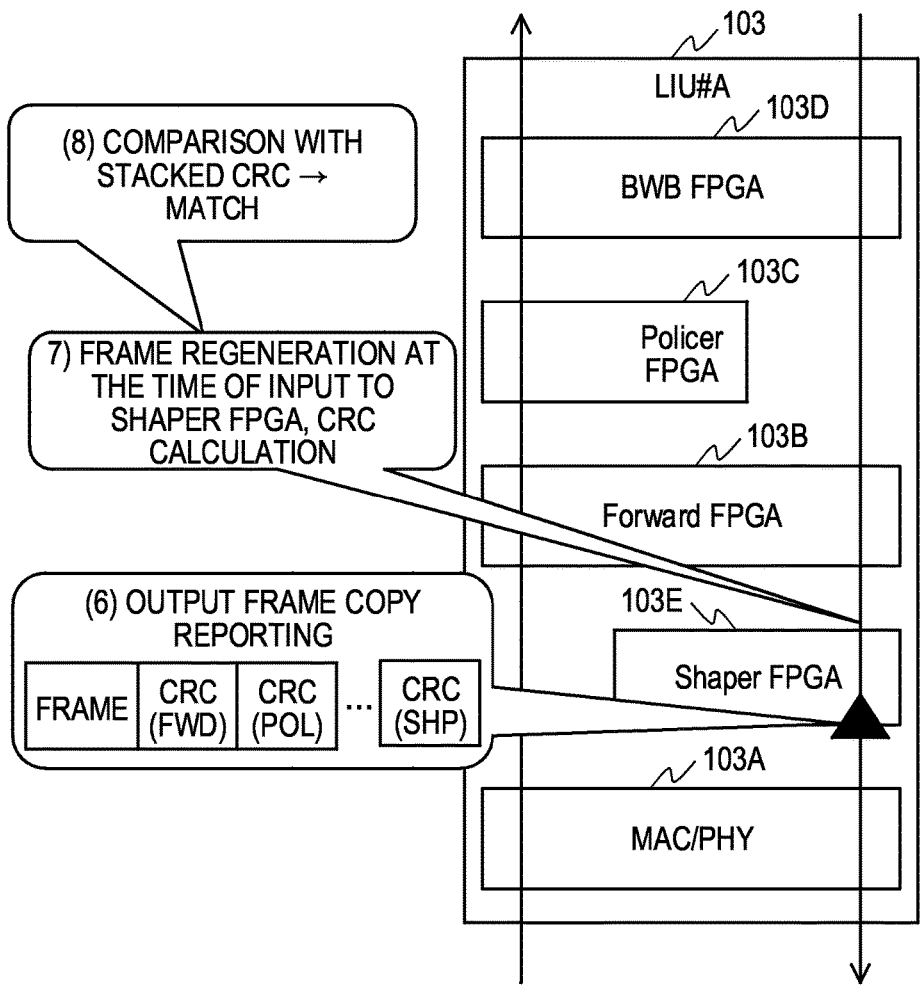
FIG. 18 is a view illustrating one example of a process of the transmitter in the specific example.

In FIG. 18, the stacking of CRC calculation results by the CRC calculation/stack unit 131 of the output side FPGA 13 of the shaper FPGA 103E and the rewrite process of the in-device header by the header conversion unit 132 are performed for the frame of the frame ID "1." Then, the frame is output. Since the shaper FPGA 103E is an FPGA through which the frame of the frame ID "1" passes finally, an output frame reporting unit 134 is included in the shaper FPGA 103E.

(6) The output frame reporting unit 134 of the shaper FPGA 103E reports a copy of the frame to the CPU firmware 20. The reported frame is a frame subjected to a rewrite process by the header conversion unit 132 of the shaper FPGA 103E and including stacked CRC calculation results by the input side FPGA 12 and output side FPGA 13 through which the frame passed. In addition, the header conversion unit 132 of the output side FPGA 13 of the shaper FPGA 103E removes, from the frame, the in-device header and the CRC calculation result added by the input side FPGA 12 and output side FPGA 13 through which the frame passed and outputs the frame to the MAC/PHY 103A.

(7) The frame analysis unit 21 of the CPU firmware 20 regenerates a frame input to the shaper FPGA 103E by referring to the rewrite history management table 23 of the LIU card #A as a reporting source for the reported frame of the frame ID "1." The frame analysis unit 21 performs a CRC calculation for the regenerated frame.

More specifically, the frame analysis unit 21 specifies a frame passage order of the output side FPGA 13 of the LIU card #A as the output side LIU card (OP11 in FIG. 14). From the frame communication route table 24 of FIG. 15, the frame passage order of the output side FPGA 13 of the LIU card #A is specified as an order of BWB interface FPGA 103D→forward FPGA 103B→shaper FPGA 103E.

The frame analysis unit 21 performs a process from the shaper FPGA 103E in an order reverse to the frame passage order. The frame analysis unit 21 detects an entry matching the frame ID "1" and the shaper FPGA (the output side) from the rewrite history management table 23 of the LIU card #A (YES in OP12 and OP13 in FIG. 14) and regenerates the frame as a state at the time of input to the shaper FPGA 103E (OP14 in FIG. 14).

It is illustrated in FIG. 18 that the entry matching the frame ID "1" and the shaper FPGA 103E in the rewrite history management table 23 of the LIU card #A has a value from $240^{th}$ bit to $242^{th}$ bit which is changed from 3 to 2 (in decimal). Therefore, by rewriting a value from $240^{th}$ bit to $242^{th}$ bit of the in-device header of the frame of the frame ID "1" from 2 (in decimal) to 3 (in decimal), the frame analysis unit 21 regenerates the frame input to the shaper FPGA 103E.

The frame analysis unit 21 performs a CRC calculation for an in-device header and an original frame portion of the regenerated frame (OP15 in FIG. 14).

(8) The frame analysis unit 21 compares a CRC calculation result calculated from the regenerated frame with the CRC calculation result stacked in the frame of the frame ID "1" and calculated by the shaper FPGA 103E (OP16 in FIG. 14). In the specific example, since no internal failure has occurred in the shaper FPGA 103E, the CRC calculation result calculated from the regenerated frame matches the CRC calculation result stacked in the frame of the frame ID "1" and calculated by the shaper FPGA 103E.

The frame analysis unit 21 performs the same process as those in items (7) and (8) for each output side FPGA 13 through which the frame of the frame ID "1" passes. When the process of each output side FPGA 13 of the LIU card #A serving as the output side LIU card is completed (NO in OP18 in FIG. 14), the frame analysis unit 21 specifies an input side FPGA 12 of the input side LIU card (OP19 in FIG. 14). More specifically, the frame analysis unit 21 searches a rewrite history management table 23 having an entry of the frame ID "1" and specifies an LIU card 1 corresponding to the rewrite history management table 23 having the entry of the frame ID "1" as the input side LIU card. Subsequently, the frame analysis unit 21 specifies an input side FPGA 12 of the specified input side LIU card by referring to the frame communication route table 24.

For example, in the specific example, since the rewrite history management table 23 of the LIU card #A has the entry of the frame ID "1," the frame analysis unit 21 specifies the LIU card #A as an input side LIU card of the frame of the frame ID "1." Subsequently, the frame analysis unit 21 specifies a frame passage order of the input side FPGA 12 of the LIU card #A as the input side LIU card as an order of forward FPGA 103B→policer FPGA 103C→BWB interface FPGA 103D by referring to the frame communication route table 24.

The frame analysis unit 21 starts a process from the BWB interface FPGA 103D as a process of the input side LIU card. That is, the frame analysis unit 21 detects an entry matching the frame ID "1" and the BWB interface FPGA (the input side) from the rewrite history management table 23 of the LIU card #A (YES in OP12 and OP13 in FIG. 14), and regenerates the frame as a state at the time of input to the BWB interface FPGA (the input side) (OP14 in FIG. 14).

Figure 19:
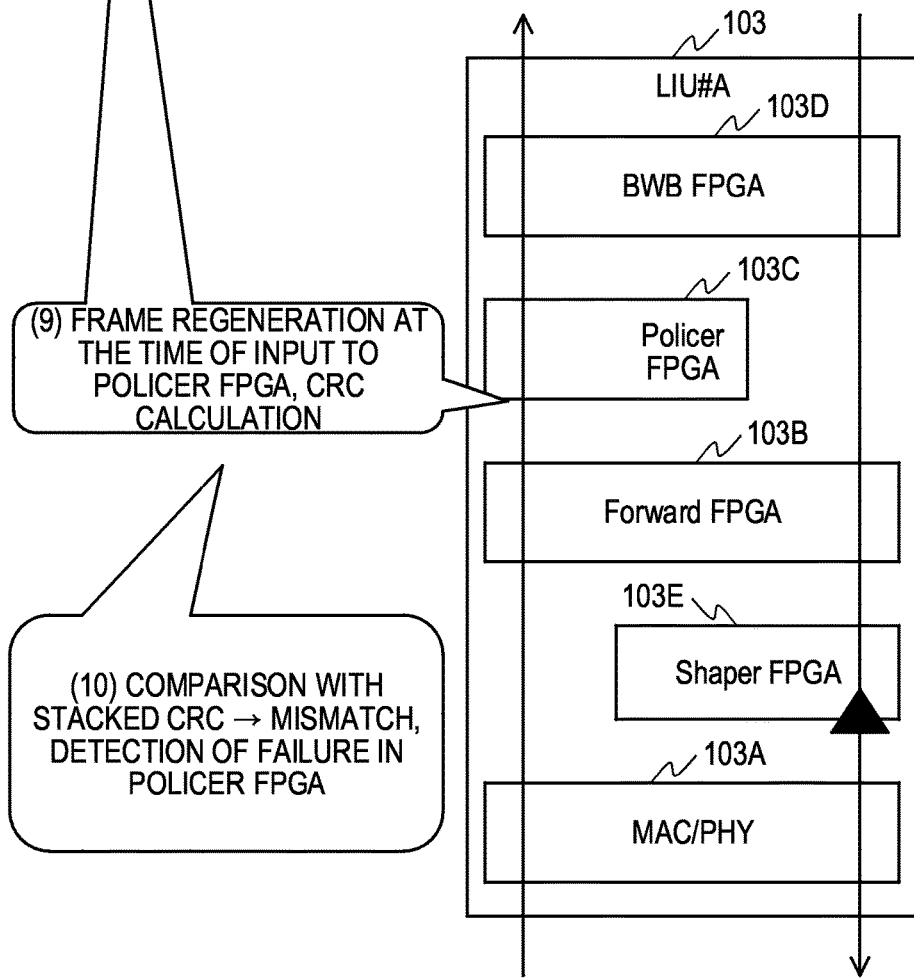
FIG. 19 is a view illustrating one example of a process of the transmitter in the specific example.

It is illustrated in FIG. 19 that the process for the frame of the frame ID "1" is completed up to the input side FPGA 12 of the BWB interface FPGA 103D. (9) The frame analysis unit 21 of the CPU firmware 20 regenerates a frame input to the policer FPGA 103C by referring to the rewrite history management table 23 of the LIU card #A as the input side LIU card for the frame of the frame ID "1." When there exists a plurality of entries matching the rewrite history management table 23 of the LIU card #A, the frame analysis unit 21 performs a reverse process for a process of all matching entries. The frame analysis unit 21 performs a CRC calculation for an in-device header and an original frame portion of the regenerated frame.

(10) The frame analysis unit 21 compares a CRC calculation result calculated from the regenerated frame with the CRC calculation result stacked in the frame of the frame ID "1" and calculated by the policer FPGA 103C (OP16 in FIG. 14). In the specific example, since it is assumed that the internal failure has occurred in the policer FPGA 103C, a frame input to the regenerated policer FPGA 103C is different from a frame input to the actual policer FPGA 103C. Therefore, the CRC calculation result calculated from the regenerated frame does not match the CRC calculation result stacked in the frame of the frame ID "1" and calculated by the policer FPGA 103C (NO in OP16 in FIG. 14).

The frame analysis unit 21 detects the internal failure of the policer FPGA 103C by the mismatch between the CRC calculation results (OP17 in FIG. 14) and reports the detected failure to the management apparatus 500. Thereafter, when an instruction to stop the failure detection mode is input from the management apparatus 500, the CPU firmware 20 reports the failure detection mode stop instruction to each LIU firmware 11 to stop the CRC calculation result stacking and rewrite history data reporting process in each FPGA 103.

[Operation and Effects of First Embodiment]

In the first embodiment, the CPU firmware 20 collects rewrite history data in an in-device header for each frame of each of the input side FPGA 12 and output side FPGA 13. In addition, the CPU firmware 20 acquires a frame added with a CRC calculation result calculated by each of the input side FPGA 12 and output side FPGA 13 through which the frame passed, from an output side FPGA 13 through which the frame passes finally. The CPU firmware 20 performs a process for a reported frame, which is reverse to the process performed in each of the input side FPGA 12 and output side FPGA 13 through which the frame passed, in an order reverse to the passage order of the frame, and regenerates a frame input to each of the input side FPGA 12 and output side FPGA 13. The CPU firmware 20 compares a CRC calculation result of the regenerated frame with a CRC calculation result added to the reported frame and detects an internal failure of the corresponding FPGA by mismatch between both of the CRC calculation results.

Therefore, according to the first embodiment, an FPGA where an internal failure in the transmitter 100 occurs may be specified at an earlier stage. In addition, since a frame reported to the CPU firmware 20 is limited to a frame having passed through the final FPGA, the amount of data introduced into the CPU firmware 20 may be reduced. In addition, since an FPGA 103 is an electronic circuit whose settings can be changed by a program, the first embodiment can be implemented simply and easily by changing settings of an existing transmitter.

[Supplement of First Embodiment]

In the first embodiment, the description has been made focusing on the function for detecting an internal failure of an FPGA for the sake of convenience. However, the internal failure detection process of FPGA described in the first embodiment and a process of detecting a transmission error between FPGAs may be performed together in the transmitter 100.

Figure 20:
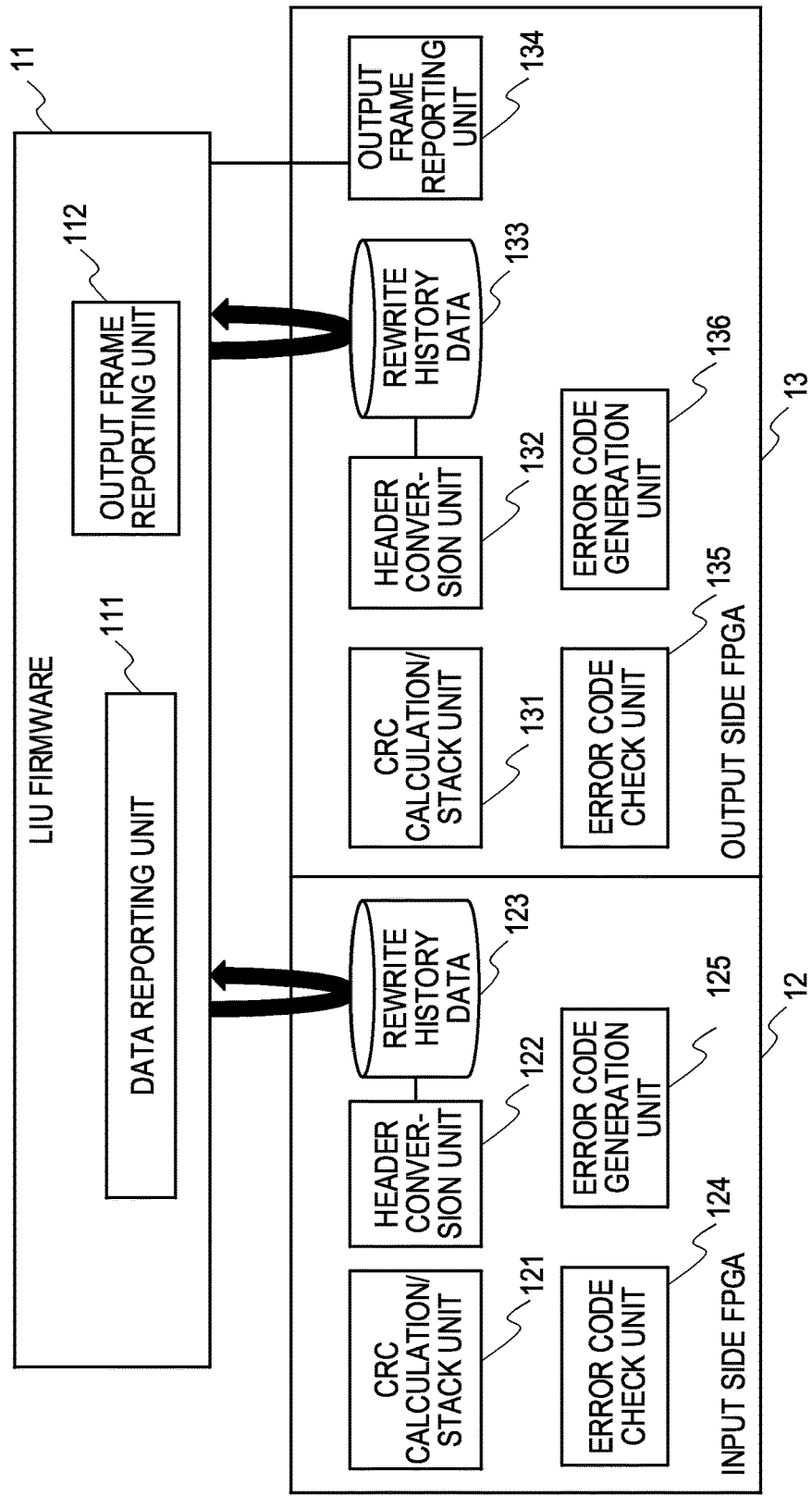
FIG. 20 is a view illustrating a functional configuration of an LIU card in a case where an FPGA internal failure detection process and a process of detecting an error of transmission between FPGAs are performed together.

FIG. 20 is a view illustrating a functional configuration of an LIU card 1 in a case where an internal failure detection process of FPGA and a process of detecting a transmission error between FPGAs are performed together. The LIU card 1 additionally includes error code check units 124 and 135 in the input side FPGA 12 and error code generation units 125 and 136 in the output side FPGA 13. The error code check units 124 and 135 and the error code generation units 125 and 136 are implemented as electronic circuits of the FPGA 103.

Each of the error code check units 124 and 135 calculates an error code for an input frame and determines whether or not the calculated error code matches an error code added to the input frame by the previous stage FPGA 103. When it is determined that the calculated error code does not match the error code added to the input frame by the previous stage FPGA 103, each of the error code check units 124 and 135 detects a transmission error between the previous stage FPGA 103 and its own FPGA.

When it is determined that the calculated error code matches the error code added to the input frame by the previous stage FPGA 103, each of the error code check units 124 and 135 removes the error code from the input frame and outputs the frame to the next functional configuration. The process of the error code check units 124 and 135 may be performed before or after the CRC calculation/stack units 121 and 131. The targets for calculation of the error codes of the error code check units 124 and 135 are an original frame and an in-device header. The targets for CRC calculation of the CRC calculation/stack units 121 and 131 are an original frame and an in-device header. This is because the error code check units 124 and 135 and the CRC calculation/stack units 121 and 131 have no effect on process results from each other. However, the process of the error code check units 124 and 135 and the process of the CRC calculation/stack units 121 and 131 are performed before the process of the header conversion units 122 and 132.

Each of the error code generation units 125 and 136 generates an error code for a frame subjected to a rewrite process of an in-device header by each of the header conversion units 122 and 132, adds the error code to the frame, and outputs the frame to the next stage FPGA 103.

[Modification 1 of First Embodiment]

In the first embodiment, a copy of a frame added with a CRC calculation result calculated by each of the input side FPGA 12 and output side FPGA 13 through which the frame passed is reported to the CPU firmware 20 from an output side FPGA 13 through which the frame passes finally. Instead, each of the input side FPGA 12 and output side FPGA 13 may include an output frame reporting unit which reports a copy of a frame subjected to a rewrite process of an in-device header to the CPU firmware 20. In this case, one CRC calculation result calculated by an input side FPGA 12 or output side FPGA 13 of a reporting source is added to the frame reported to the CPU firmware 20.

The frame analysis unit 21 of the CPU firmware 20 regenerates a frame input to each of the input side FPGA 12 and output side FPGA 13 for the reported frame, performs a CRC calculation for the regenerated frame, and compares a result of the CRC calculation with a stacked CRC calculation result. Specifically, the frame analysis unit 21 performs the process from OP12 to OP17 of FIG. 14 for the reported frame.

[Modification 2 of First Embodiment]

In the first embodiment, for a frame output from an output side FPGA 13 through which the frame passes finally, the CPU firmware 20 regenerates a frame input to each input side FPGA 12 or output side FPGA 13 and calculates an CRC for the regenerated frame. The CPU firmware 20 detects an internal failure of an FPGA 103 by comparing the calculated CRC calculation result with a stacked CRC calculation result. Instead, the CPU firmware 20 may acquire a copy of an input frame of the input side FPGA 12 and a copy of an output frame of the output side FPGA 13, perform the same process as the rewrite process of the in-device header for the input frame, and detect the internal failure of the FPGA 103 by comparing the input frame with the output frame.

Figure 21:
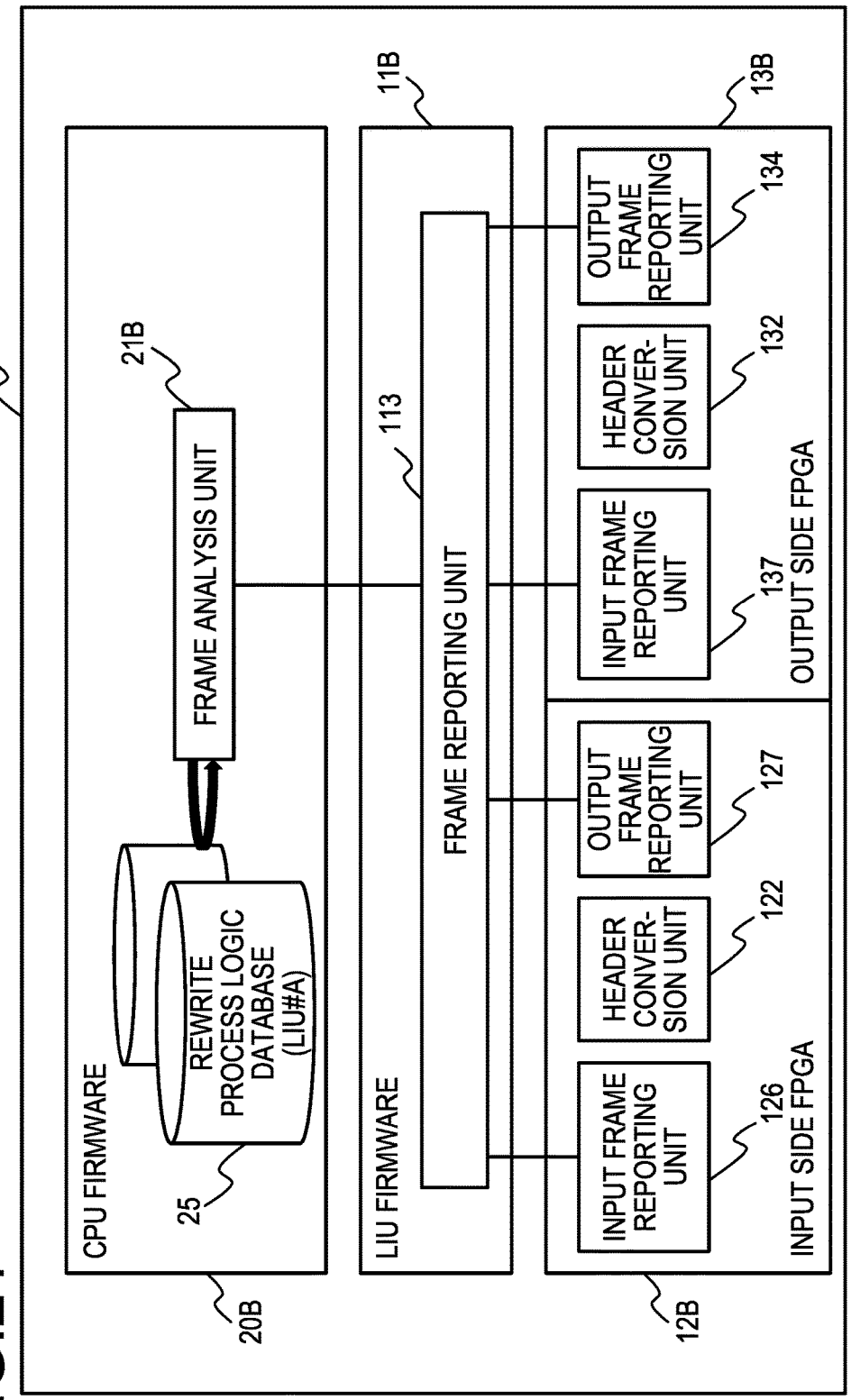
FIG. 21 is a view illustrating one example of a functional configuration of a transmitter according to Modification 2 of the first embodiment.

FIG. 21 is a view illustrating one example of a functional configuration of a transmitter 100B according to Modification 2 of the first embodiment. In Modification 2 of the first embodiment, the transmitter 100B has the same hardware configuration as the transmitter 100 of the first embodiment except that the transmitter 100B includes CPU firmware 20B, LIU firmware 11B, an input side FPGA 12B and an output side FPGA 13B as functional configurations. The hardware used to implement the functional configuration is the same as the first embodiment and, therefore, explanation of which will not be repeated.

The input side FPGA 12B and an output side FPGA 13B include input frame reporting units 126 and 137, header conversion units 122 and 132, and output frame reporting units 127 and 134, respectively. The functional configuration of each of the input side FPGA 12B and an output side FPGA 13B is implemented with an electronic circuit of each FPGA 103.

Each of the input frame reporting units 126 and 137 reports a copy of a frame before being input to the header conversion unit 122 or 132, to the CPU firmware 20B via the LIU firmware 11B. Each of the output frame reporting units 127 and 134 reports a copy of a frame subjected to a rewrite process of an in-device header by the header conversion unit 122 or 132, to the CPU firmware 20B via the LIU firmware 11B.

The LIU firmware 11B includes a frame reporting unit 113 as a functional configuration. The frame reporting unit 113 transmits a copy of an input frame or output frame reported from each of the input side FPGA 12B and output side FPGA 13B, to the CPU firmware 20B.

The CPU firmware 20B includes a frame analysis unit 21B and a rewrite process logic database 25 as functional configurations. The rewrite process logic database 25 is created in the nonvolatile memory in the control card 2. The rewrite process logic database 25 is created for each LIU card 1. The rewrite process logic database 25 stores logics of the rewrite process of in-device header which is performed in the header conversion units 122 and 1332 of the input side FPGA 12B and/or output side FPGA 13B.

Figure 22:
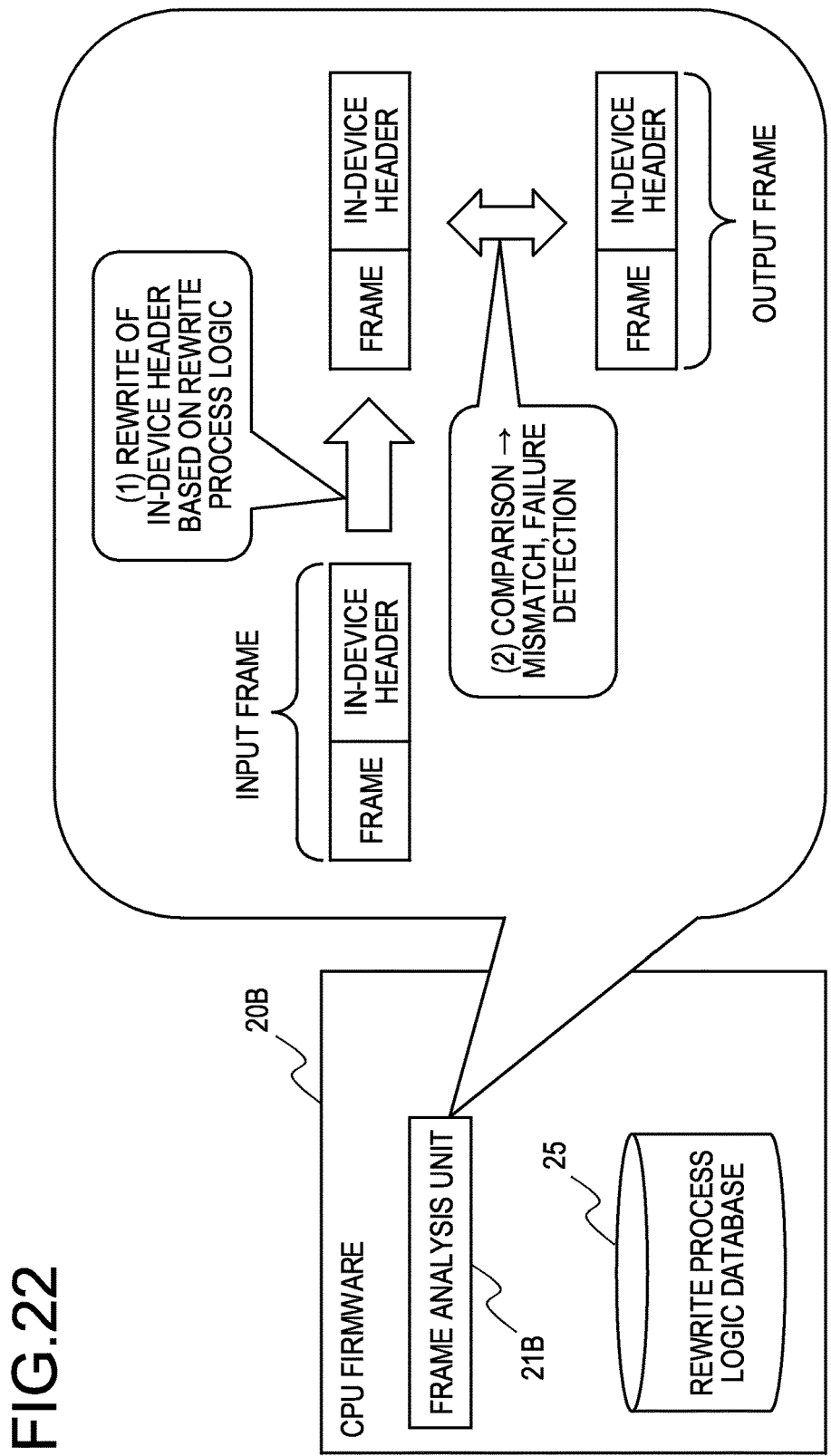
FIG. 22 is a view illustrating one example of a process of a frame analysis unit according to Modification 2 of the first embodiment.

FIG. 22 is a view illustrating one example of a process of the frame analysis unit 21B according to Modification 2 of the first embodiment. (1) The frame analysis unit 21B performs a rewrite process of an in-device header for a copy of an input frame reported from each of the input side FPGA 12B and output side FPGA 13B, according to the logics of the header conversion units 122 and 132 stored in the rewrite process logic database 25. (2) The frame analysis unit 21B compares the input frame subjected to the rewrite process of the in-device header with a copy of an output frame reported from each of the input side FPGA 12B and output side FPGA 13B, and detects an internal failure of the corresponding FPGA 103 when these frames do not match with each other.

As described above, in Modification 2, the frame analysis unit 21B performs a simulation of the process of each of the header conversion units 122 and 132 and compares a result of the simulation with an actual result (a copy of an output frame of each FPGA). In this case, an internal failure may be detected for an FPGA which performs an irreversible process such as a hash calculation.

In Modification 2 of the first embodiment, the rewrite process logic database 25 is one example of a "storage unit." A rewrite process logic stored in the rewrite process logic database 25 is one example of "information on contents of a process performed by a device." A frame input to each of the input side FPGA 12B and output side FPGA 13B is one example of a "first frame" and "information on a first frame." A frame subjected to a rewrite process by each of the header conversion units 122 and 132 of each of the input side FPGA 12B and output side FPGA 13B is one example of a "second frame" and "information on a second frame." The CPU 201 and the frame analysis unit 21B of the control card 2 are one example of a "control unit."

A program that causes a computer or other machine or apparatuses (hereinafter referred to as a computer or the like) to implement one of the above-described functions may be recorded in a recording medium which may be read by the computer or the like. This function may be provided by causing the computer or the like to read and execute a program stored in this recording medium.

Here, the recording medium which may be read by the computer or the like refers to a non-transitory recording medium which stores information such as data or programs by means of electric, magnetic, optical, mechanical or chemical action and read by the computer or the like. Among these recording media, examples of a—recording medium detachable from a computer or the like may include a flexible disk, magneto-optic disk, CD-ROM, CD-R/W, DVD, Blu-ray disk, DAT, 8 mm tape, memory card such as a flash memory, and the like. In addition, examples of a recording medium fixed to the computer or the like may include a hard disk, ROM (Read Only Memory) and the like. In addition, an SSD (Solid State Drive) may be used as either a recording medium which is detachable from the computer or the like or a recording medium which is fixed to the computer or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:

a memory in which history data of a rewrite process on which an in-device header referred in a device is rewritten is stored, the history data including data before and after the rewrite process is stored, and the device of one or more devices included in the transmission apparatus receiving a first frame including the in-device header, performing a specific process and the rewrite process, and outputting a second frame including a rewritten in-device header; and a processor configured to detect a failure of the device, based on data on the in-device header of the first frame, data on the rewritten in-device header of the second frame, and the history data stored in the memory.

2. The transmission apparatus according to claim 1, wherein the processor:

performs a predetermined calculation for the data on the in-device header of the first frame so as to acquire a first calculation result, regenerates the first frame from the second frame, based on the history data, performs the predetermined calculation for the data on the in-device header of a regenerated first frame so as to acquire a second calculation result, compares the first calculation result with the second calculation result, and detects the failure of the device when the first calculation result does not match with the second calculation result.

3. The transmission apparatus according to claim 2, wherein the device includes a calculation circuit configured to perform the predetermined calculation for the data on the in-device header of the first frame and generate the second frame in which a calculation result of the predetermined calculation is included.

4. The transmission apparatus according to claim 3, wherein the history data of the rewrite process are stored in the memory corresponding to each of the one or more devices, and in a case where two or more devices are coupled with cascade so that the second frame output from a first device of the two or more devices is received as the first frame in a second device of the two or more devices, wherein the processor acquires the in-device header included in the second frame output by a last device of the two or more devices coupled with cascade, the in-device header including a plurality of calculation results of the predetermined calculation which are calculated by the two or more devices coupled with cascade, and detects a device in which a failure occurs, based on comparisons the first calculation result with the second calculation result of each of the two or more devices, in an order from the last device to the first device.

5. The transmission apparatus according to claim 2, wherein the predetermined calculation is a cyclic redundancy check (CRC) calculation.

6. The transmission apparatus according to claim 2, wherein logics for performing the predetermined calculation are stored in the memory, and wherein the processor acquires information on the first frame and information on the second frame, and performs the predetermined calculation for the first frame and the second frame according to the logics stored in the memory.

7. The transmission apparatus according to claim 1, wherein the device is formed by a field programmable gate array (FPGA).

8. A failure detection method for a transmission apparatus including one or more devices, the failure detection method comprising:

receiving a first frame including an in-device header referred in the device;

performing a specific process and a rewrite process of rewriting the in-device header;

outputting a second frame including a rewritten in-device header;

storing history data of the rewrite process into a memory, the history data including data before and after the rewrite process is stored; and detecting a failure of the device, based on data on the in-device header of the first frame, data on the rewritten in-device header of the second frame, and the history data stored in the memory.

\* \* \* \* \*